(12) United States Patent
Takahashi

(10) Patent No.: US 8,447,727 B2
(45) Date of Patent: May 21, 2013

(54) DISTRIBUTED PROCESSING DEVICE, AND STORAGE MEDIUM STORING DISTRIBUTED PROCESSING PROGRAM

(75) Inventor: Ken Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 103 days.

(21) Appl. No.: 13/075,729

(22) Filed: Mar. 30, 2011

(65) Prior Publication Data

US 2011/0246421 A1   Oct. 6, 2011

(30) Foreign Application Priority Data

Mar. 31, 2010   (JP) .................. 2010-83900

(51) Int. Cl.
*G06F 17/30*   (2006.01)
(52) U.S. Cl.
USPC .......................................... 707/626; 707/752
(58) Field of Classification Search
USPC ........................... 707/626, 752, 769; 718/105
See application file for complete search history.

(56) References Cited

U.S. PATENT DOCUMENTS

| 5,442,765 | A | 8/1995 | Shiga | |
|---|---|---|---|---|
| 5,721,909 | A * | 2/1998 | Oulid-Aissa et al. | 1/1 |
| 7,024,414 | B2 * | 4/2006 | Sah et al. | 1/1 |
| 2004/0205761 | A1 * | 10/2004 | Partanen | 718/105 |
| 2011/0246510 | A1 * | 10/2011 | Takahashi | 707/769 |

FOREIGN PATENT DOCUMENTS

JP   2586219   12/1996

* cited by examiner

*Primary Examiner* — Hung T Vy
(74) *Attorney, Agent, or Firm* — Staas & Halsey LLP

(57) ABSTRACT

A distributed processing device includes receiving unit receives a plurality of process requests to records stored on a database, an acquiring unit acquires execution frequency of each processes responsive to the plurality of process requests related to a record identified by an attribute name, on a per attribute name basis of a plurality of attribute names, each attribute name identifying each of the plurality of records, sorting unit sorts the plurality of process requests into a first set and a second set in accordance with the acquired execution frequency of each process on each of the plurality of attribute names, a determining unit determines a first node, serving as an allocation destination of the process request sorted in the first set, from among a plurality of nodes, each node having the database, and an allocating unit allocates the process request sorted in the first set to the first node.

13 Claims, 30 Drawing Sheets

FIG. 8

| ENTITY (TABLE NAME) | ATTRIBUTES | | | | | | |
|---|---|---|---|---|---|---|---|
| STATISTICS OF STUDENTS | SCHOOL ID(PK) | TOTAL NUMBER | NUMBER OF FRESHMEN | NUMBER OF SOPHOMORES | NUMBER OF JUNIORS | NUMBER OF SENIORS | ... |
| STATISTICS OF TEACHING PERSONNEL | SCHOOL ID(PK) | TOTAL NUMBER | NUMBER OF TEACHERS | NUMBER OF OFFICE WORKERS | NUMBER OF PART-TIMERS | NUMBER OF ADMINISTRATION OFFICERS | ... |
| INCOME | SCHOOL ID(PK) | TOTAL | SCHOOL FEES | SUBSIDY | EXAMINATION FEES | LECTURE FEES | ... |
| SPENDING | SCHOOL ID(PK) | TOTAL | PAYROLL | FACILITY COSTS | ADMINISTRATIVE FEES | HEAT AND LIGHT EXPENSES | ... |
| ... | ... | ... | ... | ... | ... | ... | ... |

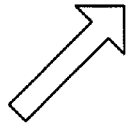

(EXCLUSIVE ITEM NAME LIST)

STATISTICS OF STUDENTS:TOTAL NUMBER
NUMBER OF FRESHMEN
NUMBER OF SOPHOMORES
NUMBER OF JUNIORS
NUMBER OF SENIORS
.....
NUMBER OF OFFICE WORKERS:TOTAL NUMBER
NUMBER OF TEACHERS
NUMBER OF OFFICE WORKERS
NUMBER OF PART-TIMERS
NUMBER OF ADMINISTRATION OFFICERS
.....
INCOME:TOTAL
SCHOOL FEES
SUBSIDY
EXAMINATION FEES
LECTURE FEES
.....
SPENDING:TOTAL
PAYROLL
FACILITY COSTS
ADMINISTRATIVE FEES
HEAT AND LIGHT EXPENSES
.....

| | EXCLUSIVE ITEM TRANSACTION DATA | E | D | C | B | A | 1 | 2 | 3 |
|---|---|---|---|---|---|---|---|---|---|
| (a) | 12 | 1 | 1 | 0 | 0 | 0 | 0 | 0 | 0 |
| | 20 | 1 | 1 | 0 | 0 | 0 | 1 | 1 | 1 |
| | ... | | | | | | | | |
| (b) | 15 | 1 | 0 | 1 | 0 | 0 | 1 | 0 | 0 |
| | ... | | | | | | | | |
| (c) | 8 | 0 | 0 | 0 | 1 | 1 | 0 | 1 | 0 |
| | ... | | | | | | | | |
| | 19 | 0 | 0 | 1 | 1 | 0 | 0 | 1 | 0 |
| | ... | | | | | | | | |
| | 32 | 0 | 0 | 1 | 0 | 0 | 0 | 0 | 1 |
| | ... | | | | | | | | |

FIG. 13

| EXCLUSIVE ITEM TRANSACTION DATA | E | D | C | B | A | 1 | 2 | 3 | |
|---|---|---|---|---|---|---|---|---|---|
| 12 | 1 | 1 | 0 | 0 | 0 | 0 | 0 | 0 | (a) |
| 20 | 1 | 1 | 0 | 0 | 0 | 1 | 1 | 1 | (a) |
| ... | | | | | | | | | (a) |
| 34 | 1 | 1 | 0 | 0 | 0 | 0 | 0 | 0 | ←1310 |
| 15 | 1 | 0 | 1 | 0 | 0 | 1 | 0 | 0 | (b) |
| ... | | | | | | | | | (b) |
| 8 | 0 | 0 | 0 | 1 | 1 | 0 | 1 | 0 | (c) |
| ... | | | | | | | | | (c) |
| 19 | 0 | 0 | 1 | 1 | 0 | 0 | 1 | 0 | (c) |
| ... | | | | | | | | | (c) |
| 32 | 0 | 0 | 1 | 0 | 0 | 0 | 0 | 1 | (c) |
| ... | | | | | | | | | (c) |

| EXCLUSIVE ITEM | E | D | C | B | A | 1 | 2 | 3 | 4 |
|---|---|---|---|---|---|---|---|---|---|
| 5 | 1 | 1 | 0 | 0 | 0 | 1 | 0 | 0 | 0 |
| 8 | 1 | 1 | 0 | 0 | 0 | 1 | 0 | 0 | 0 |
| 10 | 1 | 1 | 0 | 0 | 0 | 1 | 0 | 0 | 0 |
| 16 | 1 | 1 | 0 | 0 | 0 | 1 | 0 | 0 | 0 |
| 17 | 1 | 1 | 0 | 0 | 0 | 1 | 0 | 0 | 0 |
| 22 | 1 | 1 | 0 | 0 | 0 | 1 | 0 | 0 | 0 |
| 1 | 1 | 0 | 0 | 0 | 1 | 0 | 0 | 0 | 0 |
| 3 | 0 | 1 | 1 | 0 | 0 | 0 | 0 | 0 | 0 |
| 9 | 1 | 0 | 1 | 0 | 0 | 0 | 0 | 0 | 0 |
| 13 | 0 | 1 | 0 | 0 | 1 | 0 | 0 | 0 | 0 |
| 19 | 1 | 0 | 0 | 1 | 0 | 0 | 0 | 0 | 0 |
| 24 | 0 | 1 | 1 | 0 | 0 | 0 | 0 | 0 | 0 |

(a) covers rows 5–22; (b) covers rows 1–24

| EXCLUSIVE ITEM | E | D | C | B | A | 1 | 2 | 3 | 4 |
|---|---|---|---|---|---|---|---|---|---|
| 2 | 0 | 0 | 0 | 1 | 1 | 0 | 0 | 0 | 0 |
| 4 | 0 | 0 | 1 | 0 | 0 | 0 | 1 | 1 | 1 |
| 6 | 0 | 0 | 0 | 0 | 1 | 0 | 0 | 0 | 0 |
| 7 | 0 | 0 | 0 | 0 | 1 | 0 | 1 | 1 | 1 |
| 11 | 0 | 0 | 0 | 0 | 1 | 0 | 0 | 0 | 0 |
| 12 | 0 | 0 | 1 | 1 | 0 | 0 | 1 | 1 | 1 |
| 14 | 0 | 0 | 0 | 0 | 1 | 1 | 1 | 1 | 1 |
| 15 | 0 | 0 | 1 | 0 | 1 | 0 | 1 | 1 | 1 |
| 18 | 0 | 0 | 0 | 1 | 1 | 0 | 0 | 0 | 0 |
| 20 | 0 | 0 | 0 | 0 | 0 | 0 | 1 | 1 | 1 |
| 21 | 0 | 0 | 1 | 0 | 0 | 0 | 0 | 0 | 0 |
| 23 | 0 | 0 | 1 | 1 | 0 | 0 | 0 | 0 | 0 |

| EXCLUSIVE ITEM | E | D | C | B | A | 1 | 2 | 3 | 4 |
|---|---|---|---|---|---|---|---|---|---|
| 26 | 0 | 1 | 1 | 0 | 0 | 0 | 0 | 0 | 0 |
| 30 | 0 | 1 | 1 | 0 | 0 | 0 | 0 | 0 | 0 |
| 31 | 0 | 1 | 1 | 0 | 0 | 0 | 0 | 0 | 0 |
| 36 | 0 | 1 | 1 | 0 | 0 | 0 | 0 | 0 | 0 |
| 3 | 0 | 1 | 1 | 0 | 0 | 0 | 0 | 0 | 0 |
| 9 | 1 | 0 | 1 | 0 | 0 | 0 | 0 | 0 | 0 |
| 13 | 0 | 1 | 0 | 0 | 1 | 0 | 0 | 0 | 0 |
| 19 | 1 | 0 | 0 | 1 | 0 | 0 | 0 | 0 | 0 |
| 24 | 0 | 1 | 1 | 0 | 1 | 0 | 0 | 0 | 0 |
| 29 | 1 | 0 | 0 | 0 | 0 | 0 | 0 | 0 | 0 |
| 33 | 1 | 0 | 0 | 1 | 0 | 0 | 0 | 0 | 0 |
| 38 | 0 | 1 | 1 | 0 | 0 | 0 | 0 | 0 | 0 |

(a) rows 26–36; (b) rows 3–38

| EXCLUSIVE ITEM | E | D | C | B | A | 1 | 2 | 3 | 4 |
|---|---|---|---|---|---|---|---|---|---|
| 2 | 0 | 0 | 1 | 0 | 1 | 0 | 0 | 0 | 0 |
| 6 | 0 | 0 | 1 | 0 | 1 | 0 | 0 | 0 | 0 |
| 11 | 0 | 0 | 1 | 0 | 1 | 0 | 0 | 0 | 0 |
| 20 | 0 | 0 | 0 | 1 | 1 | 0 | 0 | 0 | 0 |
| 23 | 0 | 0 | 1 | 1 | 0 | 0 | 0 | 0 | 0 |
| 25 | 0 | 0 | 1 | 1 | 0 | 0 | 0 | 0 | 0 |
| 27 | 0 | 0 | 1 | 0 | 1 | 0 | 0 | 0 | 0 |
| 28 | 0 | 0 | 1 | 0 | 1 | 0 | 0 | 0 | 0 |
| 32 | 0 | 0 | 0 | 1 | 0 | 0 | 0 | 0 | 0 |
| 34 | 0 | 0 | 1 | 1 | 1 | 0 | 0 | 0 | 0 |
| 35 | 0 | 0 | 0 | 1 | 0 | 0 | 0 | 0 | 0 |
| 37 | 0 | 0 | 1 | 1 | 0 | 0 | 0 | 0 | 0 |

| ENTITY (TABLE NAME) | ATTRIBUTES | | | | | | |
|---|---|---|---|---|---|---|---|
| STATISTICS OF STUDENTS | SCHOOL ID(PK) | TOTAL NUMBER | NUMBER OF FRESHMEN | NUMBER OF SOPHOMORES | NUMBER OF JUNIORS | NUMBER OF SENIORS | ... |
| STATISTICS OF TEACHING PERSONNEL | SCHOOL ID(PK) | TOTAL NUMBER | NUMBER OF TEACHERS | NUMBER OF OFFICE WORKERS | NUMBER OF PART-TIMERS | NUMBER OF ADMINISTRATION OFFICERS | ... |
| INCOME | SCHOOL ID(PK) | TOTAL | SCHOOL FEES | SUBSIDY | EXAMINATION FEES | LECTURE FEES | ... |
| SPENDING | SCHOOL ID(PK) | TOTAL | PAYROLL | FACILITY COSTS | ADMINISTRATIVE FEES | HEAT AND LIGHT EXPENSES | ... |
| ... | ... | | | | | | |

500

DISTRIBUTED PROCESSING DEVICE, AND STORAGE MEDIUM STORING DISTRIBUTED PROCESSING PROGRAM

CROSS-REFERENCE TO RELATED APPLICATIONS

This application is based upon and claims the benefit of priority of the prior Japanese Patent Application No. 2010-083900, filed on Mar. 31, 2010, the entire contents of which are incorporated herein by reference.

FIELD

Various embodiments described herein relate to a distributed processing device, a storage medium storing a distributed processing program, and a distributed processing method.

BACKGROUND

A today's widely used system in crowd computing field permits a plurality of request sources to make a process request to a database. A system of the type receiving a process request to a common server from a plurality of clients as request sources includes a plurality of nodes performing the received process request.

However, if the system merely causes the plurality of nodes to perform the plurality of process requests, a progress status of each node is difficult to learn in response to the process request. There is a possibility that the process requests center on a particular node. A technique of using a forward proxy device for receiving together the process requests from a plurality of clients is available.

The forward proxy device evenly sorts the received process requests among a plurality of nodes in order to lighten workload. The use of the forward proxy device helps learn which node performs a process request issued by a process request source as a client. Replication transparency and location transparency are thus guaranteed (as described in Japanese Patent No. 2586219).

SUMMARY

According to an aspect of an embodiment, a distributed processing device includes receiving unit that receives a plurality of process requests of a plurality of processes to one of a plurality of records stored on a database, an acquiring unit that acquires an execution frequency of each of the plurality of processes responsive to the plurality of process requests related to a record identified by an attribute name, on a per attribute name basis of a plurality of attribute names, each attribute name identifying each of the plurality of records, a sorting unit that sorts the plurality of process requests into a first set and a second set in accordance with the acquired execution frequency of each process on each of the plurality of attribute names, the first set responsive to a record identified by a first attribute name from among the plurality of attribute names and the second set being different from the first set, a determining unit that determines a first node, serving as an allocation destination of the process request sorted in the first set, from among a plurality of nodes, each node having the database, and an allocating unit that allocates the process request sorted in the first set to the first node.

The object and advantages of the invention will be realized and attained by at least the elements, features, and combinations particularly pointed out in the claims.

It is to be understood both the foregoing general description and the following detailed description are exemplary and explanatory and are not restrictive of the invention, as claimed.

BRIEF DESCRIPTION OF DRAWINGS

FIG. 8 illustrates a definition of an exclusive item name;
FIG. 12 illustrates a storage process of a transaction data item cache table;
FIG. 13 illustrates an insertion process of an exclusive item bit;
FIG. 20 illustrates a storage process of storing the record on the transaction data item cache table with four process nodes;
FIG. 22 illustrates a deletion process of a processed transaction ID on the transaction data item cache table;
FIG. 23 illustrates a storage process of an unprocessed transaction ID on the transaction data item cache table;
FIG. 25 illustrates an example of data to be processed.

DESCRIPTION OF EMBODIMENTS

According to the related art techniques described above, the system typically includes nodes having databases thereof to improve reliability. Synchronization between the databases of the nodes reduces the throughput of each node. If the nodes have stateful design, state synchronization is performed between the nodes, and the frequency of synchronization increases between the nodes. Even if the number of nodes serving as process handlers is increased, scale-out does not lead to an increase in the process speed.

With reference to the attached drawings, a device, a method, and a program for distributed processing process as embodiments of the invention are described below.

Figure 1:
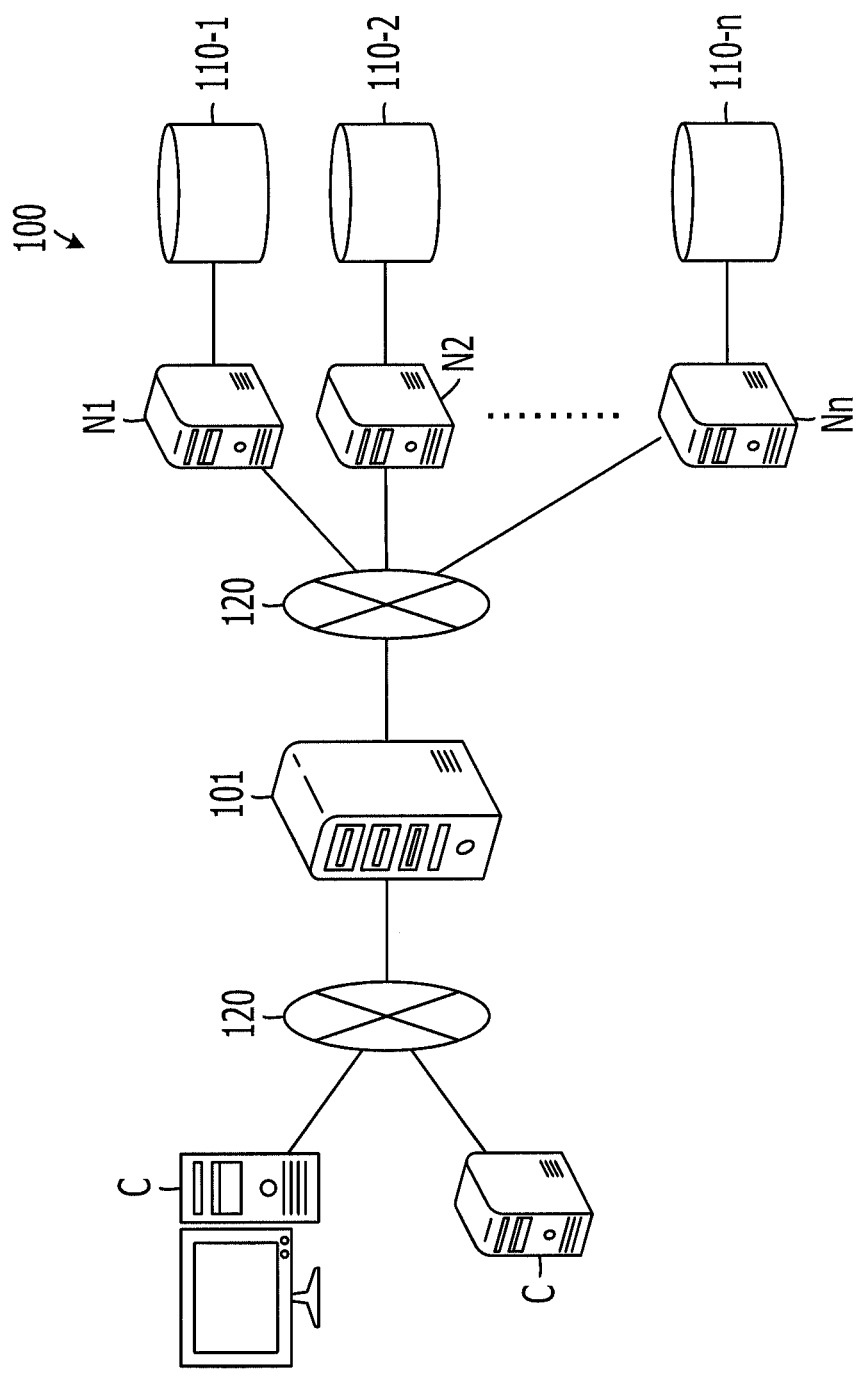
FIG. 1 illustrates an example of a network system.

FIG. 1 illustrates a network system 100 of one embodiment. Referring to FIG. 1, the network system 100 includes a distributed processing device 101, nodes N1-Nn, and client devices C. The distributed processing device 101, the nodes N1-Nn, and the clients C are connected to each other via wired or wireless network 120 in the network system 100.

The network system 100 finds applications in a high-availability system. In response to a process request of each process from the client device C, the distributed processing device 101 allocates processes to the nodes N1-Nn. The distributed processing device 101 is a proxy server, for example.

The nodes N1-Nn are computers performing processes allocated by the distributed processing device 101 and respectively include databases 110-1 through 110-$n$ storing a common record group. The client device C transmits to the distributed processing device 101 a process request of a process to the record group in the databases 110-1 through 110-$n$. The client device C may be a personal computer or a server, for example.

In the discussion that follows, the common record group stored in the databases 110-1 through 110-$n$ is referred to as "a record group R1-Rm," and any one of the record R1-Rm is referred to as a "record Rj" (j=1, 2, . . . , m). Any one of the nodes N1-Nn is referred to as a "node Ni" (i=1, 2, . . . , n).

Figure 2:
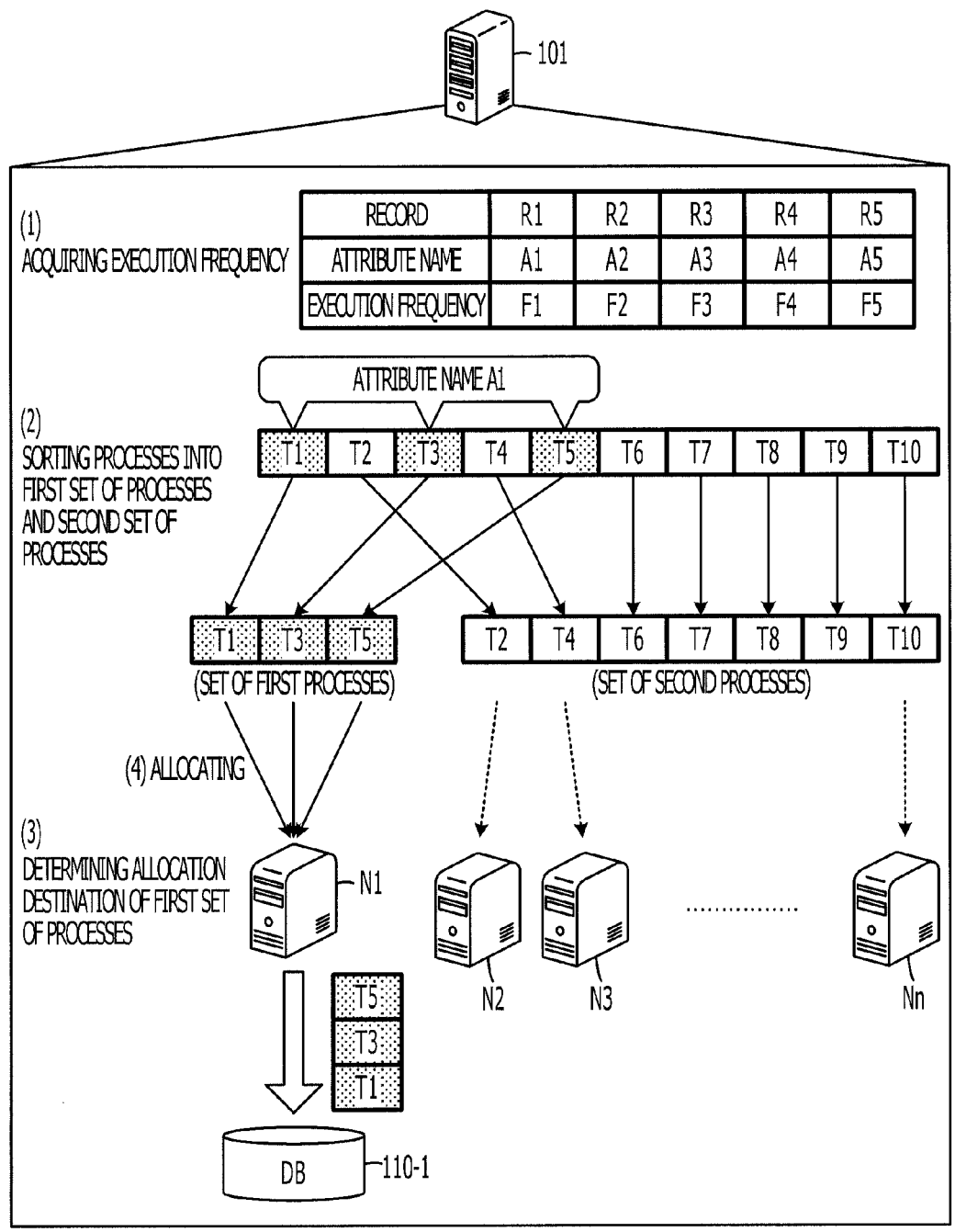
FIG. 2 illustrates of a distributed processing device as one embodiment.

The distributed processing device 101 as one embodiment is described below. FIG. 2 illustrates the distributed processing device 101. A record group stored in the databases 110-1 through 110-$n$ is referred to as "records R1-R5," and a process group corresponding to the record group R1-R5 is referred to as "processes T1-T10."

(1) The distributed processing device 101 acquires, on a per attribute name basis, an execution frequency of a process performed on the record Rj identified by an attribute name. The process performed on the record Rj may be an update process, a reference process, or a write process performed on the record Rj.

The attribute name is information identifying the record Rj. For example, the attribute name includes an item name of data included in the record Rj (field name), or a file name (table name) of a file (table). The attribute name identifying a single record Rj may include a combination of a file name and an item name, or a plurality of item names.

For example, the record Rj having field name "total number" within a table having a table name "statistics of students" includes data of the "number of freshmen," the "number of sophomores," and the "number of juniors." The attribute name of the record Rj may be "statistics of students, freshmen, sophomores, juniors," for example. The attribute name identifying each record Rj stored in the databases 110-1 through 110-$n$ is preset.

The execution frequency of the process on the record Rj refers to a ratio of the occurrences of the process request of a process on the record Rj to the process requests of the processes received from the client device C by the distributed processing device 101. For example, the distributed processing device 101 may now receive 100 process requests, and 10 process requests of the processes on the record Rj may be included in the received 100 process requests. In this case, the execution frequency of the processes on the record Rj is 0.1 (=10/100).

In the discussion that follows, the attribute names identifying records R1-Rm are referred to as "attribute names A1-Am," and any attribute name of the attribute names A1-Am is referred to as "Aj" (j=1, 2, . . . , m). The execution frequency of the record Rj is referred to as an "execution frequency Fj."

As illustrated in FIG. 2, execution frequencies F1-F5 of the processes on the records R1-R5 respectively identified by the attribute names A1-A5 are acquired. If the magnitude relationship of the execution frequencies F1-F5 is defined as follows: F1>F2>F3>F4>F5, the process on the record R1 has the highest frequency of occurrences from among the processes of the records R1-R5.

(2) The distributed processing device 101 sorts the plurality of processes T1-TK into a set of first processes corresponding to the record identified by a first attribute name and another set of second processes different from the first processes. The process request of each process includes the attribute name Aj identifying the record Rj as a process target. The distributed processing device 101 thus identifies the record Rj as the process target of the process from the attribute name Aj included in the process request.

For example, the distributed processing device 101 sorts the process Tk (k=1, 2, . . . , K) into the set of first processes if the attribute name included in the process request of the process Tk is the first attribute name. The distributed processing device 101 sorts the process Tk into the set of second processes if the attribute name included in the process request of the process Tk is a second attribute name different from the first attribute name.

For example, the attribute name A1 having the maximum execution frequency of the process from among the attribute names A1-A5 is the first attribute name. If the attribute name included in the process request of the process Tk is the attribute name A1, the distributed processing device 101 sorts the process Tk into the set of first processes. If the attribute name included in the process request of the process Tk is different from the attribute name A1, the distributed processing device 101 sorts the process Tk into the set of second processes. As a result, the processes T1, T3, and T5 are sorted in the set of first processes, and the processes T2, T4, T6, T7, T8, T9, and T10 are sorted into the set of second processes.

(3) The distributed processing device 101 selects a node serving as an allocation destination of the set of first processes sorted, from among the nodes N1-Nn. Here, the node N1 is selected as the allocation destination of the set of first processes from among the nodes N1-Nn.

(4) The distributed processing device 101 allocates the first process to the node Ni determined as the allocation destination of the set of first process. The processes T1, T3, and T5 included in the set of first processes are allocated to the node N1. As a result, the processes T1, T3, and T5 on the record R1 are executed on only the database 110-1 included in the N1. The processes T2, T4, T6, T7, T8, T9, and T10 included in the set of second processes may be allocated to any node Ni of the nodes N1-Nn.

The distributed processing device 101 sorts the processes T1-TK to be allocated to the nodes N1-Nn into the set of first process and the set of second processes, and allocates the first processes to the substantially same node. In this way, the first processes center on a single node. Synchronization to cause data contents of the record Rj as a process target of the first process to match each other is postponed to reduce synchronization count. Overhead for the synchronization process is reduced.

The distributed processing device 101 may specify a single attribute name in response to the execution frequency Fj of the process identified by each attribute name Aj. By specifying as one attribute name the attribute name Aj having the highest execution frequency Fj, the overhead of the synchronization process occurring at the execution of the process having the highest frequency of occurrences is effectively reduced.

While the allocation destination of the first process is fixed to the node N1 in the above example, the synchronization of the data contents of the record R1 between the nodes is not necessary. The overhead of the synchronization process occurring at the execution of the process having the highest frequency of occurrences is thus effectively reduced. The network system 100 is free from a performance drop.

Hardware Configuration of the Distributed Processing Device

Figure 3:
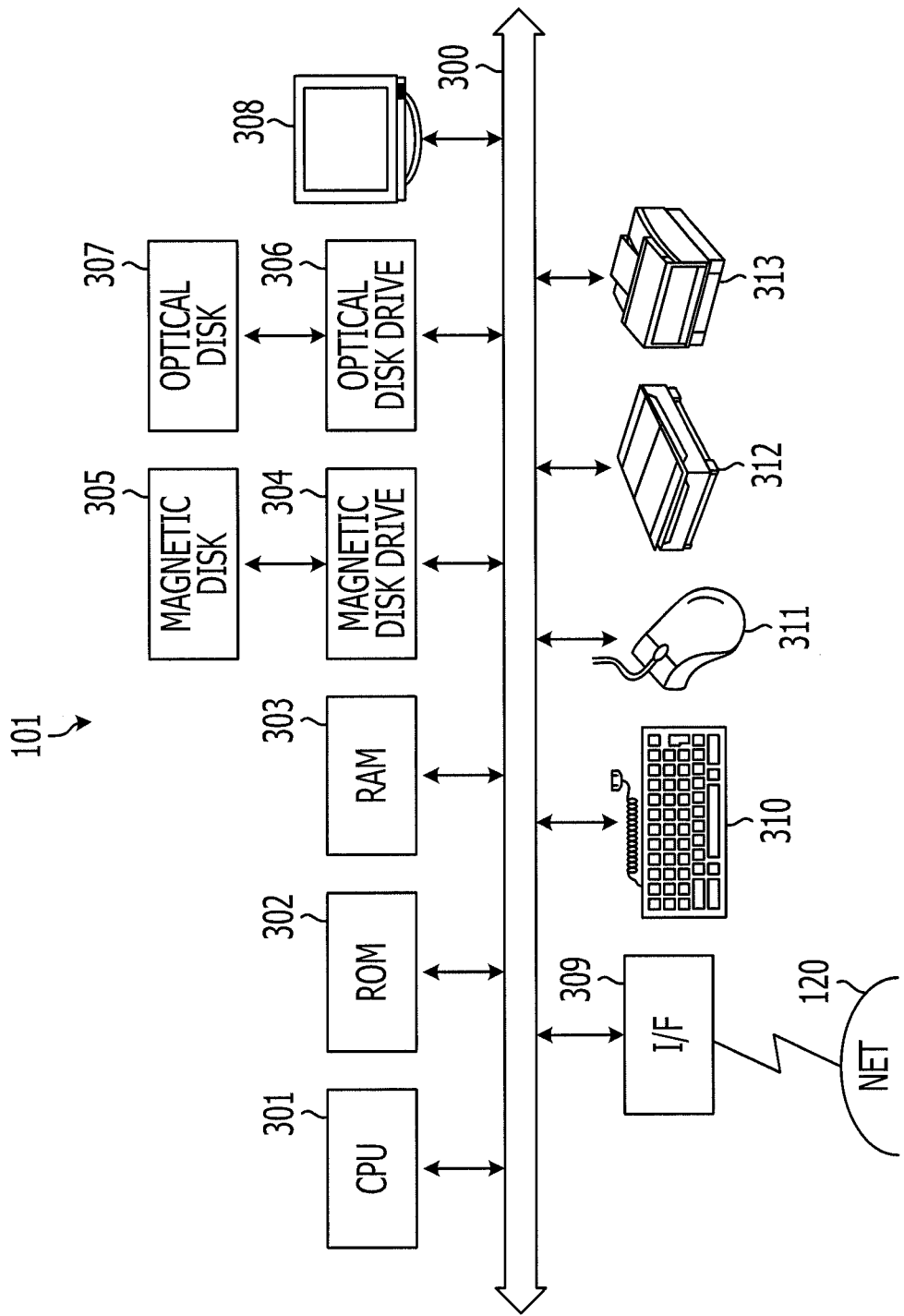
FIG. 3 illustrates an example of a hardware configuration of the distributed processing device.

FIG. 3 illustrates a hardware configuration of the distributed processing device of the embodiment. As illustrated in FIG. 3, the distributed processing device 101 includes central processing unit (CPU) 301, read-only memory (ROM) 302, random-access memory (RAM) 303, magnetic disk drive 304, magnetic disk 305, optical disk drive 306, optical disk 307, display 308, interface (I/F) 309, keyboard 310, mouse 311, scanner 312, and printer 313. Those elements are connected via a bus 300.

The CPU 301 generally controls the distributed processing device 101. The ROM 302 stores a variety of computer programs such as a boot program and a distributed processing program for performing a distributed processing process. The RAM 303 is used as a work area of the CPU 301. The magnetic disk drive 304 under the control of the CPU 301 controls read/write operations on the magnetic disk 305. The magnetic disk 305 stores data written under the control of the magnetic disk drive 304.

The optical disk drive 306 under the control of the CPU 301 controls read/write operations of data to the optical disk 307. The optical disk 307 under the control of the optical disk drive 306 stores the written data and causes the computer to read the stored data.

The display 308 displays a cursor, an icon, a toolbox. The display 308 also displays data such as a document, an image, and functional information. The display 308 may include a cathode-ray tube (CRT), a thin-film transistor (TFT) liquid-crystal display, or a plasma display.

The interface 309 is connected to a network 120 such as a local-area network (LAN), a wide-area network (WAN), or the Internet via a communication line. The interface 309 is thus connected to an external device via the network 120. The interface 309 serves as an interface between the network 120 and the internal elements of the distributed processing device 101. The interface 309 controls outputting and inputting of data to and from the external device. A modem or a LAN adaptor may be used for the interface 309.

The keyboard 310 includes keys for inputting characters, numerals, and a variety of instructions, and thus inputs data. The keyboard 310 may be a touch panel input pad or touchpad numerical keys. The mouse 311 is used to move a cursor, to set a range on a screen, to move a window, or modify a size of the window. A trackball or a joystick with a function of a pointing device may be used for the mouse 311.

The scanner 312 optically reads an image, and retrieves image data into the distributed processing device 101. The scanner 312 may have a function of an optical character reader (OCR) function. The printer 313 prints output image data and text data. A laser printer or an ink-jet printer may be used for the printer 313.

Functional Configuration of the Distributed Processing Device

Figure 4:
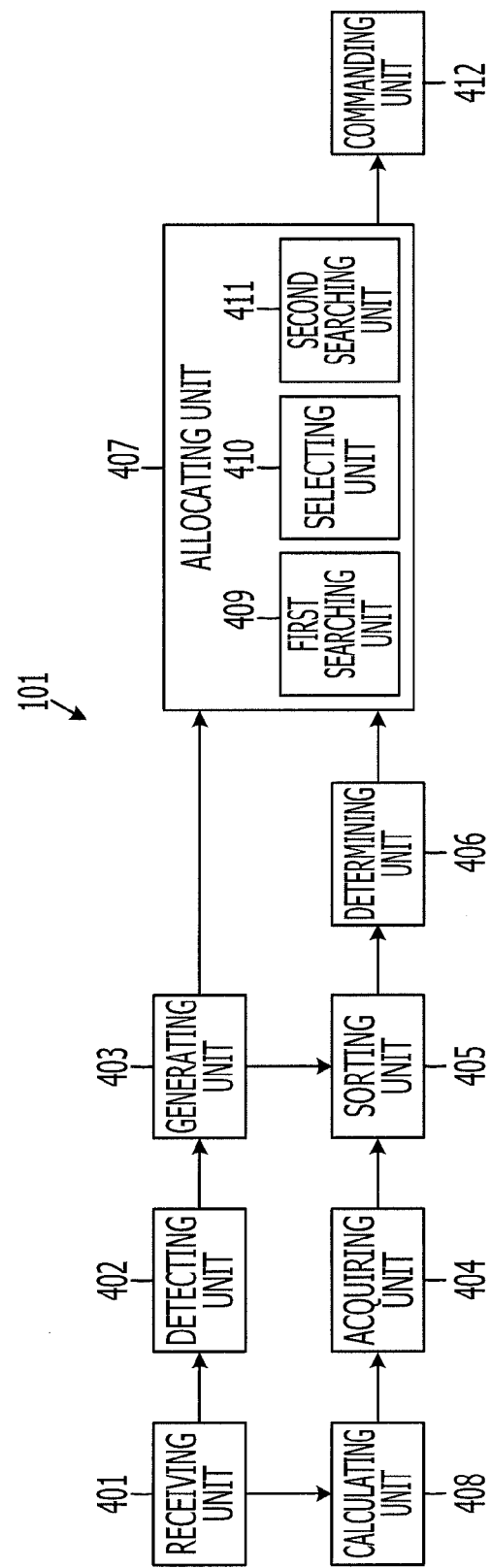
FIG. 4 illustrates an example of a functional configuration of the distributed processing device.

The functional configuration of the distributed processing device 101 of the embodiment is described below. FIG. 4 illustrates an example of the distributed processing device 101. The distributed processing device 101 of FIG. 4 includes receiving unit 401, detecting unit 402, generating unit 403, acquiring unit 404, sorting unit 405, determining unit 406, allocating unit 407, calculating unit 408, first searching unit 409, selecting unit 410, second searching unit 411, and commanding unit 412. The functional elements (the receiving unit 401 through the commanding unit 412) may be implemented by causing the CPU 301 to execute the program stored on a storage device such as the ROM 302, the RAM 303, the magnetic disk 305, and the optical disk 307 illustrated in FIG. 3, or may be executed by the interface 309. The process results of the functional elements (the receiving unit 401 through the commanding unit 412) are stored on storage device such as the RAM 303, the magnetic disk 305, and the optical disk 307.

The receiving unit 401 has a function of receiving from the client device C a process request of a process Tk to the record Rj stored on the databases 110-1 through 110-$n$. The process request is a digital text or a sequential file requesting the process Tk to be performed on the record Rj.

The process request may request a single request Tk, or a plurality of processes Tk such as a transaction or a batch job. For example, the process request may request the process Tk to be performed on a single record Rj, or may request a series of processes Tk to be performed on a plurality of records Rj.

The process request may be a digital text (data) in a defined schema structure, such as external markup language (XML). The process request includes the attribute name Aj identifying the record Rj as a process target. If the process request is an update process or a write process, the process request includes data as an update target or a write target.

The attribute name Aj identifying the record Rj may be set beforehand on the storage device such as the ROM 302, the RAM 303, the magnetic disk 305, or the optical disk 307. A specific example of the attribute name Aj identifying the record Rj is described with reference to FIGS. 7 and 8.

The detecting unit 402 has a function of detecting the attribute name Aj from the process request of a received process Tk. For example, the detecting unit 402 detects from the process request a character train (such as a character train enclosed by tags) defining the attribute name Aj in accordance with a data format of the process request. The data format of the process request may be an XML element format or an XML attribute format.

The generating unit 403 generates a bit train on each attribute name Aj identifying the record Rj in response to the detection results. The bit train indicates whether the attribute name Aj is included in the process request of the received process Tk. If the attribute name Aj is included in the process request, the generating unit 403 generates a bit train indicating "1" for each attribute name Aj if the attribute name Aj is included in the process request and generates a bit train indicating "0" if the attribute name Aj is not included in the process request. If the total number of the preset attribute names Aj is m, the resulting bit train becomes m bits.

For example, the attribute name A3 may be included in the process request of the received Tk with m=5. The bit train indicating whether the attribute names A1-A5 are included in the process requests may be "00100" in the order of the attribute names A1-A5. The bit train helps easily identify the attribute name Aj included in the process request of the process Tk (the attribute name A3 in the above example).

The acquiring unit 404 acquires, on each attribute name Aj identifying the record Rj, the execution frequency Fj of the process on the record Rj identified by the attribute name Aj. The acquiring unit 404 may acquire the execution frequency Fj of the process on the record Rj in response to an operation input entered on the keyboard 310 or the mouse 311 illustrated in FIG. 3 by the user. The acquiring unit 404 may acquire the execution frequency Fj of the process on the record Rj calculated by the calculating unit 408 to be discussed below.

The sorting unit 405 sorts the plurality of processes T1-TK into a set of first processes and a set of second processes according to the execution frequency Fj of the process on each acquired attribute name Aj. The set of first processes is identified by a first attribute name and the set of second processes is different from the set of first processes. The first attribute name may be selected from among the attribute names A1-Am. For example, the first attribute name may be the one having an execution frequency larger than the others from among the attribute names A1-Am.

As an example, the first attribute name may be an attribute name having the highest execution frequency from among the attribute names A1-Am. For example, the sorting unit 405 identifies the attribute name $A_{max}$ of the process having the highest execution frequency from among the attribute names A1-Am in accordance with the execution frequency Fj of the process on each acquired attribute name Aj.

If the attribute name included in the process request of the process Tk is the attribute name $A_{max}$, the distributed processing device 101 sorts the process Tk into the set of first processes. If the attribute name included in the process request of the process Tk is different from the attribute name $A_{max}$, the distributed processing device 101 sorts the process Tk into the set of second processes. The sorting unit 405 may easily determine whether the attribute name $A_{max}$ is included the process request by referencing the generated bit train of the process request of the process Tk. The efficiency of the sorting unit process is thus increased.

The determining unit 406 determines from among the nodes N1-Nn the node Ni serving as an allocation destination of the sorted first process. For example, the determining unit 406 determines as the allocation destination of the set of first processes the node Ni having the highest throughput selected from among the nodes N1-Nn. In the discussion that follows, the node Ni determined as the allocation destination of the set of first processes is referred to as a "first node."

The allocating unit 407 allocates the first process to the first node. For example, the allocating unit 407 may allocate the first process searched by the first searching unit 409 to be discussed later to the first node. The allocating unit 407 may allocate the second process to a second node different from the first node from among the nodes N1-Nn. For example, the allocating unit 407 may allocate the second process searched by the second searching unit 411 to be discussed later to the second node.

The calculating unit 408 calculates the execution frequency Fj of the process on the record Rj on each attribute name Aj in response to the process request of the received process Tk. For example, during a specific period of time, the calculating unit 408 calculates the execution frequency Fj of the process on the record Rj on each attribute name Aj in response to the process request of the process Tk received during the specific period of time.

The acquiring unit 404 acquires the calculated execution frequency Fj of the process on the record Rj during the specific period corresponding to the period throughout which the process requests of the target processes T1-TK are received.

For example, if the process requests of the processes T1-TK to be allocated are acquired on Monday, the execution frequency Fj of the process in response to the process request of the process Tk acquired on the previously Monday is acquired.

The first attribute name may be specified in view of a variation in the execution frequency Fj of the process that may vary depending on month, day of the week, and time band. The execution frequency Fj of the process on the record Rj may be calculated using an apriori algorithm. The process content of the calculating unit 408 is described below with reference to FIGS. 11 and 26.

The selecting unit 410 has a function of selecting a second node from the remaining nodes of the nodes N1-Nn excluding the first node. For example, the selecting unit 410 may select the second node from among the remaining nodes of the nodes N1-Nn. The second node may be selected in the order of high to low throughput.

The first searching unit 409 has a function of searching the first set for a first process according to a specific search condition. For example, the first searching unit 409 may search the first set for the first process having the oldest reception time of the process request. The allocating unit 407 may allocate the first process searched and hit by the first searching unit 409 to the first node.

The oldest first process is thus executed first. The consistency of the data content of the record Rj as a process target of the first process is thus assured. The first searching unit 409 may search the set of first processes for a first process having the highest priority attached to the process request of each process Tk. In this way, the first process having the highest priority is executed first.

According to a specific search condition, the second searching unit 411 searches the second set of second processes a second process. For example, the second searching unit 411 may search the second set of second processes for a second process having the oldest reception time of the process request. The allocating unit 407 allocates the second process searched and hit by the second searching unit 411 to the second node selected by the selecting unit 410.

The oldest second process is thus executed first. The consistency of the data content of the record Rj as a process target of the second process is thus assured. The second searching unit 411 may search the set of second processes for a second process having the highest priority attached to the process request of each process Tk. In this way, the second process having the highest priority is executed first.

If no second process is hit, the second searching unit 411 may search a set of processes allocated to any node Ni of the nodes N1-Nn by the allocating unit 407 for an allocated process having the oldest reception time of the process request. In such a case, the allocating unit 407 may allocate the process searched and hit by the second searching unit 411 to the second node. In this way, the synchronization process is performed to cause the data contents of the records Rj to match each other among the databases of the remaining nodes of the nodes N1-Nn excluding the first node.

The commanding unit 412 issues a synchronization command to the nodes N1-Nn in order to cause the data contents of a record group R1-Rm to match each other among the databases if no first process is hit by the first searching unit 409. For example, the commanding unit 412 transmits the synchronization command to the nodes N1-Nn via the network 120.

The synchronization process that is postponed is automatically performed. The substantially sameness of the data contents of the record group R1-Rm is thus assured among the databases. In one embodiment, synchronization command may be issued to the nodes N1-Nn at any timing in response to an operation input entered by the user on the keyboard 310 or the mouse 311.

Distributed Processing Process of the Distributed Processing Device

Figure 5:
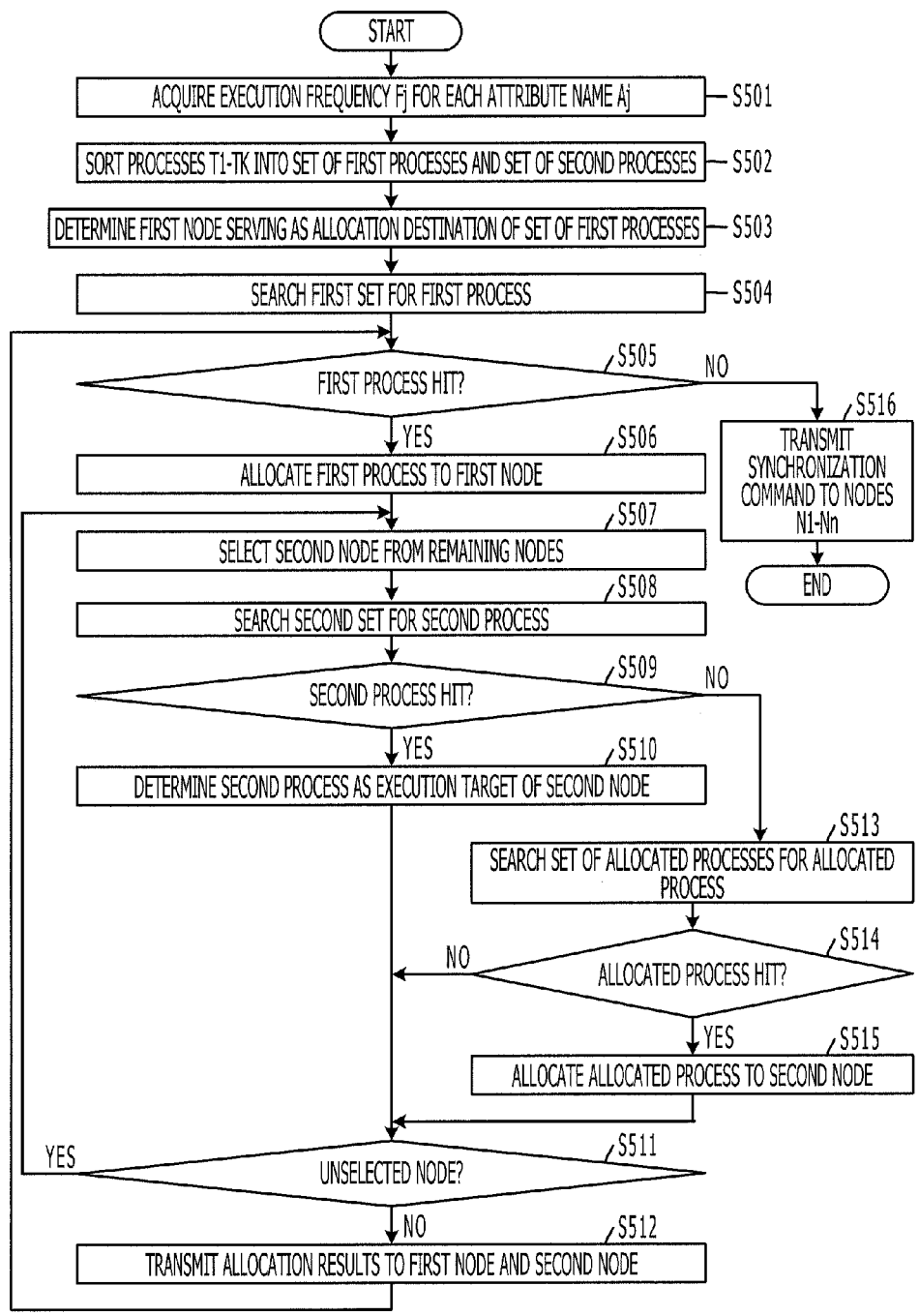
FIG. 5 is a flowchart illustrating a distributed processing process of the distributed processing device.

The distributed processing process of the distributed processing device 101 of the embodiment is described below. FIG. 5 is a flowchart illustrating an example of the distributed processing process of the distributed processing device 101 of the embodiment. The plurality of processes as the targets to be allocated to the nodes N1-Nn are referred to as "processes T1-TK."

As illustrated in FIG. 5, the acquiring unit 404 acquires the execution frequency Fj of the process on the record Rj identified by the attribute name Aj on each attribute name Aj identifying the record Rj (S501). In response to the acquired execution frequency Fj of the process on each record Rj, the sorting unit 405 sorts the processes T1-TK into the first set of first processes identified by the first attribute name and the second set of second processes (S502). The first attribute name is an attribute name having the highest execution frequency from among the attribute names A1-Am.

The determining unit 406 determines from among the nodes N1-Nn the first node serving as the allocation destination of the first process sorted (S503). The first searching unit 409 searches the first set of first processes for a first process having the oldest reception time of the process request (S504).

If the first process is hit (yes from S505), the allocating unit 407 allocates the first hit process to the first node (S506). The selecting unit 410 selects a second node from among the nodes N1-Nn excluding the first node (S507).

The second searching unit 411 searches the second set of second processes for a second process having the oldest reception time of the process request (S508). If the second process is hit (yes from S509), the allocating unit 407 allocates the second process hit to the second node (S510).

The selecting unit 410 determines whether an unselected node is present among the remaining nodes of the nodes N1-Nn excluding the first node (S511). If there remains an unselected node (yes from S511), processing returns to S507. If no unselected node is present (no from S511), the allocating unit 407 transmits the allocation results to the first node and the second node (S512). Processing returns to operation S505.

The allocation results of the first node are the process request of the first process allocated to the first node. The allocation results of the second node are the process request of the second process allocated to the second node or of the allocated process.

If the second process is not hit in S509 (no from S509), the second searching unit 411 searches the set of processes allocated to the node Ni of the nodes N1-Nn for an allocated process having the oldest reception time of the process request (S513).

If the allocated process is hit (yes from S514), the allocating unit 407 allocates the hit allocated process to the second node (S515). Processing proceeds to S511. If the allocated process is not hit (no from S514), processing proceeds to S511.

If the first process is not hit in S505 (no from S505), the commanding unit 412 transmits to the nodes N1-Nn the synchronization command to cause the data contents of the record group R1-Rm to match each other (S516). The series of operations in the process of the flowchart of FIG. 5 is thus complete.

As described above, the distributed processing device 101 of the embodiment sorts the processes T1-TK into the first set of first processes identified by the first attribute name and the second set of second processes in accordance with the execution frequency Fj of the process on each attribute name Aj. The distributed processing device 101 also determines the first node serving the allocation destination of the first set of first processes from among the nodes N1-Nn, and allocates the first process to the first node.

The first processes thus center on the first node, and the synchronization process to cause the data contents of the record Rj as a process target of the first process to match each other is postponed to reduce the synchronization process count. The overhead for the synchronization process is thus reduced. By specifying as the first attribute name the attribute name Aj having the highest execution frequency Fj, the overhead for the synchronization process occurring in the execution of the process having the highest execution frequency is efficiently reduced.

The distributed processing device 101 allocates the first process to the first node while also allocating the second process to the second node from among the nodes N1-Nn different from the first node. Since the second node is not allocated to the first node, the synchronization process to cause the data contents of the record Rj as a process target of the second process to match each other may be postponed.

The distributed processing device 101 searches the first set of first processes not allocated from among the first set of first process for the first process having the oldest reception time of the process request, and then allocates the first process hit to the first node. The first processes are executed starting with the one having the oldest reception time of the process request. The consistency of the data contents of the records Rj as the process target of the first process is thus assured.

The distributed processing device 101 searches the second set of second processes not allocated from among the second set of second process for the second process having the oldest reception time of the process request, and then allocates the second process hit to the second node selected from among the nodes N1-Nn excluding the first node. The second processes are executed starting with the one having the oldest reception time of the process request. The consistency of the data contents of the records Rj as the process target of the second process is thus assured.

If the second process is not hit, the distributed processing device 101 searches the set of processes allocated to the node Ni from among the nodes N1-Nn for the allocated process having the oldest reception time of the process request, and then allocates the hit process to the second node. The synchronization process to cause the data contents of the records Rj to match each other among the databases of the remaining nodes of the nodes N1-Nn excluding the first node may be thus performed.

The distributed processing device 101 generates on each attribute name Aj identifying each record Rj the bit train indicating whether the process request of the process Tk includes the attribute name Aj. The distributed processing device 101 easily identifies whether the first attribute name is included in the process request by referencing the bit train of the process request of the process Tk. The sorting unit process is performed efficiently.

The distributed processing device 101 calculates the execution frequency Fj of the process of each attribute name Aj in response to the process request of each process Tk received during a specific period of time, and thus acquires the execution frequency Fj of the process taking into consideration the tendency depending on the period. The first attribute name may be specified in view of a variation in the execution frequency Fj of the process that may vary depending on month, day of the week, and time band.

If no first process is hit, the distributed processing device 101 may issue the synchronization command to the nodes N1-Nn to cause the data contents of the record group R1-Rm to match each other among the databases. The synchronization process that is postponed is automatically performed. The substantially sameness of the data contents of the record group R1-Rm is thus assured among the databases.

The distributed processing device 101 of the embodiment is described below. The distributed processing device 101 is applied to a forward proxy device in a manner such that the distributed processing process is performed on transaction data.

Forward Proxy Device Performing the Distributed Processing Process

Figure 6:
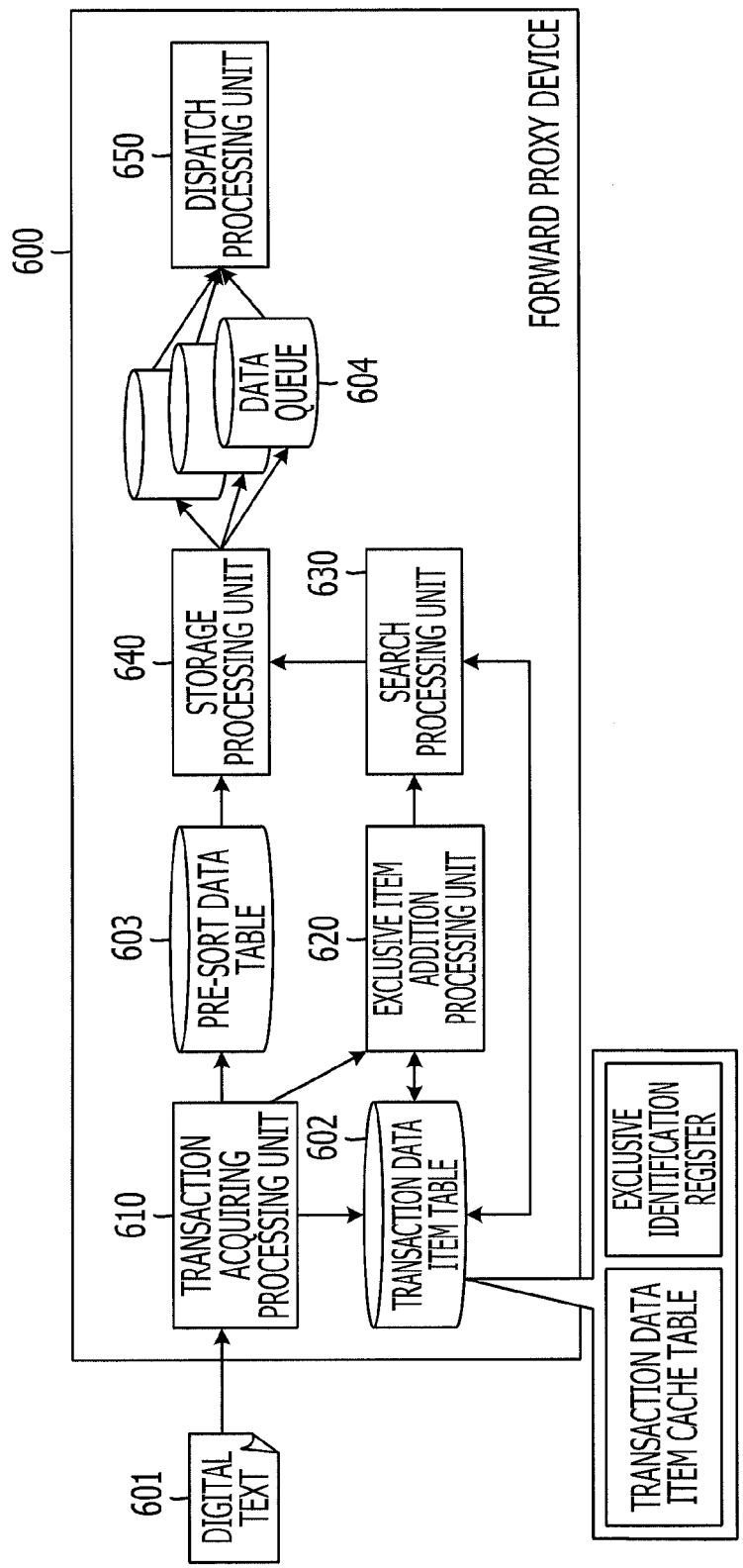
FIG. 6 illustrates a forward proxy apparatus including the distributed processing device.

FIG. 6 illustrates a forward proxy device 600 to which the distributed processing device of the embodiment is applied. FIG. 25 illustrates an example of a data table 500 of data as a process target. The forward proxy device 600 of FIG. 6 acquires transaction data such as the data table 500 of FIG. 25 and causes each process node to process the transaction data. The data table 500 includes entities and attributes. The transaction data handled by the forward proxy device 600 includes one record in the database based on an attribute of the data table 500.

As illustrated in FIG. 6, the forward proxy device 600 acquires at a time the transaction data requesting a process on a common database, and then sorts the transaction data to process nodes performing parallel processes on the common database, for example, process nodes "1," "2," and "3" as illustrated below with reference to FIG. 17.

The transaction data may be a digital text 601 input by an online client. The forward proxy device 600 acquires the above-described transaction data as a process request to the common databases respectively arranged on the process nodes. The forward proxy device 600 then temporarily stores the transaction data. Unprocessed transaction data units of the stored transaction data are then sorted to the process nodes, and then processed as the substantially same process.

When processing the transaction data, the forward proxy device 600 references an access frequency of a record to be accessed. The forward proxy device 600 processes the transaction data corresponding to a combination of records having the highest access frequency with the highest priority, separate from other transaction data. The access frequency corresponds to the above-described execution frequency Fj.

The forward proxy device 600 sorts the transaction data such transaction data of a combination other than the combination of records having a high access frequency is processed by a process node different from the process node processing the transaction data of the combination of records having the high access frequency. For example, two types of transaction data sorted to the different process nodes through the substantially same process have exclusiveness among the records as the process targets.

The forward proxy device 600 sorts the transaction data such that transaction data units accessing the substantially same record are processed by the substantially same process node (such as process node "1") with a higher priority. The necessity of the synchronization process is reduced as much as possible because the transaction data units accessing the substantially same record are not processed by another process node.

As a result, the distributed processing device 101 is free from the problems of the related art distributed processing device, such as a lock state caused by an access congestion on the substantially same record, and a frequent synchronization process. Each process node processes the transaction data independent of another process node. Waiting time in the synchronization process is reduced, thereby increasing process efficiency.

An example of the configuration of the forward proxy device 600 is described below. As illustrated in FIG. 6, the forward proxy device 600 as functional elements implementing the elements of the distributed processing device 101 includes transaction acquiring processing unit 610, exclusive item addition processing unit 620, search processing unit 630, storage processing unit 640, and dispatch processing unit 650.

The transaction acquiring processing unit 610 has the functions of the receiving unit 401, the detecting unit 402, and the generating unit 403 in the distributed processing device 101. The exclusive item addition processing unit 620 has the functions of the acquiring unit 404 and the sorting unit 405. The search processing unit 630 has the functions of the determining unit 406, the selecting unit 410, and the second searching unit 411. The storage processing unit 640 has the functions of the allocating unit 407. The dispatch processing unit 650 has the control function for controlling a node having a process allocated by the allocating unit 407. Those elements are discussed in detail.

The forward proxy device 600 includes, as storage areas storing data, transaction data item table 602, pre-sort data table 603, and data queue 604 for each process node. The transaction data item table 602 includes a fast-access transaction data item cache and an exclusive identification register. The operation of the storage areas is described in detail together with related elements.

Data Structure

The data structure of the transaction data to be input to the forward proxy device 600 is described before the discussion of the distributed processing process of the forward proxy device 600. In response to information included in the acquired transaction data, the forward proxy device 600 identifies a record that is accessed in the processing of the transaction data. If the process nodes perform parallel processes onto the common databases, the transaction data is sorted in the processes of the process nodes such that the substantially same record is not accessed at a time.

The forward proxy device 600 references the information identifying the record to be accessed in the execution of the process, and prepares beforehand information indicating which record is to be accessed. The forward proxy device 600 identifies as a process target any data of an entity listed in the data table 500 (see FIG. 25) in accordance with the data format of the acquired transaction data. In response to the identified data as the process target, the forward proxy device 600 identifies a record to be accessed when the process node processes the transaction data.

Figure 7:
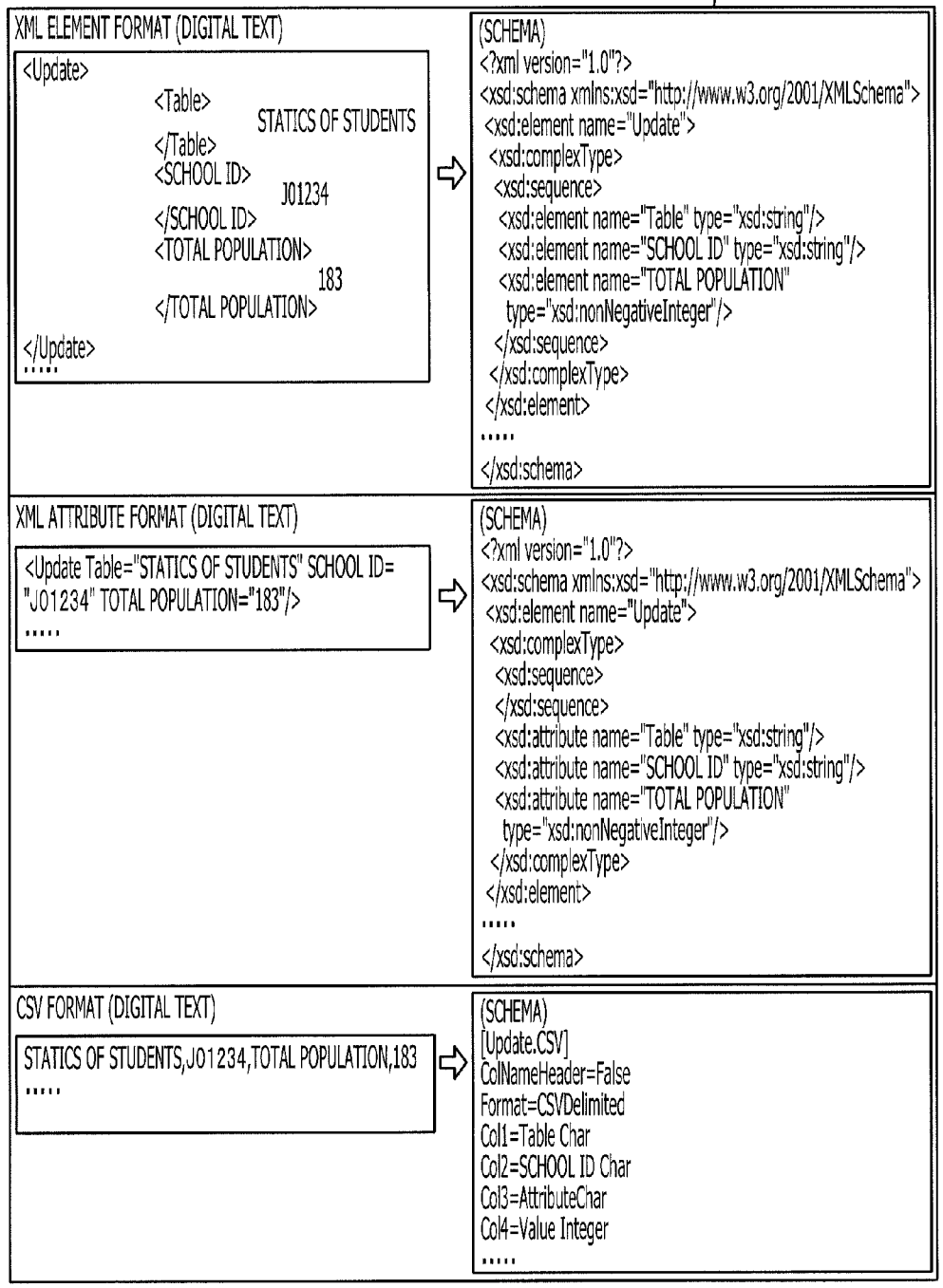
FIG. 7 illustrates an example of an acquiring process of a digital text of various formats and a schema.

FIG. 7 illustrates a digital text of various formats and an acquired schema. A data train 700 of FIG. 7 represents a specific format of a digital text 601 to be input to the forward proxy device 600 and a schema meaning specifications of display contents of the digital text 601 on a per data format basis. The data train 700 of FIG. 7 lists, as the formats of the digital text 601, (A) XML element format, (B) XML attribute format, and (C) comma separated values (CSV) format. In the digital text 601 of any format, a process to update the total number to "183" in a record of school ID "JO1234" in statistics of students table is written.

FIG. 8 illustrates the definition of an exclusive item name. In the forward proxy device 600, an exclusive item name list as denoted by a data train 800 of FIG. 8 is set. The exclusive item name list includes "statistics of students," "statistics of teaching personnel," "income," "spending" set as the exclusive item names. A data table 810 to be accessed in the execution of the process is determined depending on the data of the attribute of each exclusive item name of the transaction data.

Using the data table 810 having attributes and exclusive item names set in the substantially same row, an exclusive item name is uniquely identified from an attribute included in the transaction data. For example, if the forward proxy device 600 acquires the digital text 601 illustrated in the data train 700 of FIG. 7, an exclusive item name is identified from an attribute included in the digital text 601. The exclusive item name is not an actual name, such as "statistics of students," or "statistics of teaching personnel," but identifier in order to identify itself with a fewer bit numbers as listed below:

Attribute 811 related to statistics of students: exclusive item name A;

Attribute 812 related to statistics of teaching personnel: exclusive item name B;

Attribute 813 related to income: exclusive item name C;

Attribute 814 related to spending: exclusive item name D; and

Any attribute of remainder: exclusive item name E.

Data having attributes set in the substantially same exclusive item name is stored on the substantially same record. If the digital text 601 includes attribute 811 related to statistics of students, the digital text 601 has the exclusive item name A as a process target in the above setting. If the digital text 601 includes a plurality of exclusive item names, such as the exclusive item names A and C as a process target, a plurality of records are accessed in accordance with a single unit of transaction data.

Transaction Acquiring Processing Unit

Figure 9:
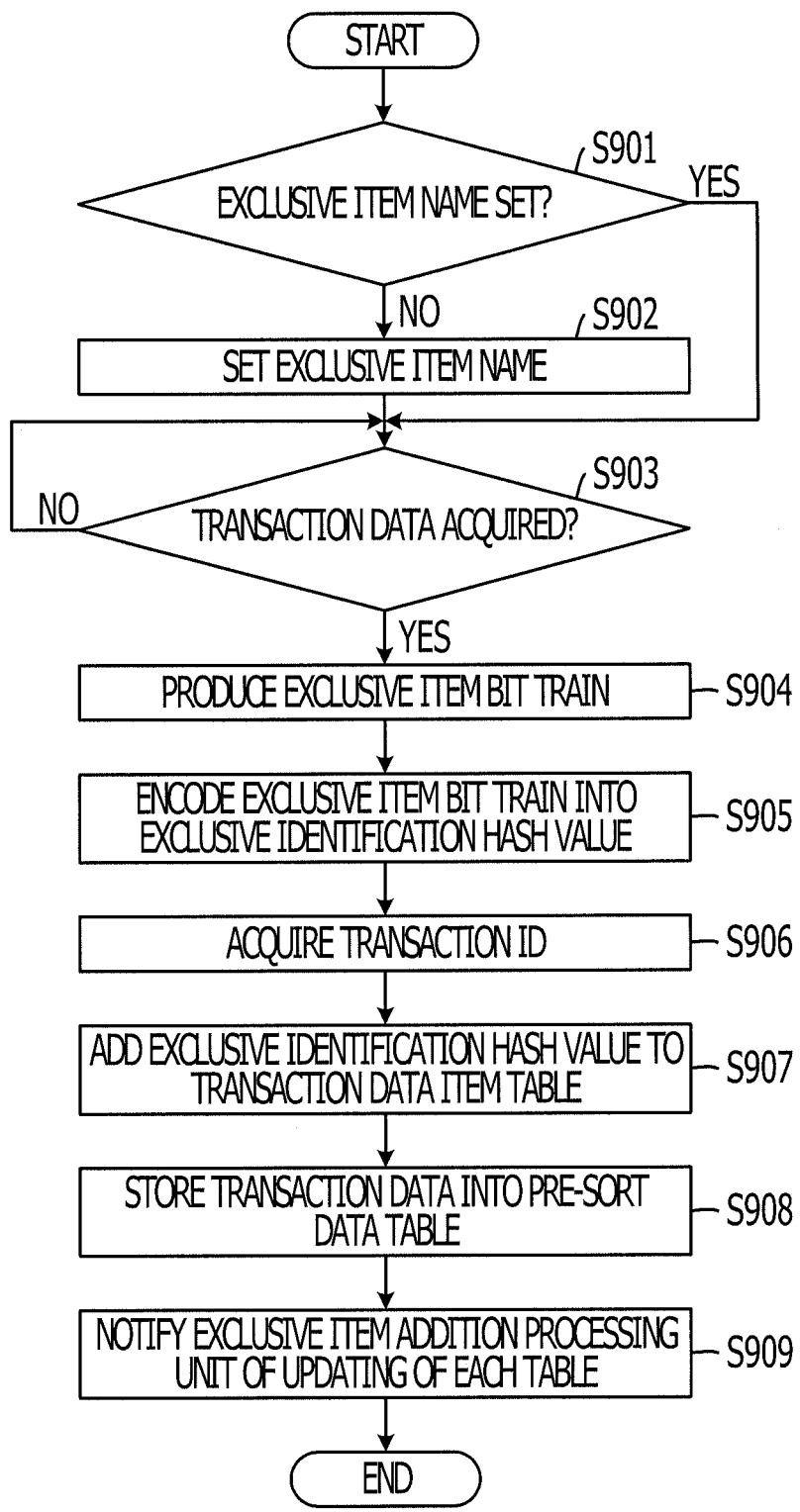
FIG. 9 is a flowchart illustrating a process of a transaction acquiring processing unit.

FIG. 9 is a flowchart illustrating a process of the transaction acquiring processing unit 610. The transaction acquiring processing unit 610 acquires the transaction data with the common database as a process target. The transaction acquiring processing unit 610 starts the process thereof in response to an inputting of the transaction data (such as the digital text 601) from an online client as a trigger.

The transaction acquiring processing unit 610 of FIG. 9 determines in a pre-process whether an "exclusive item name" as a keyword for extracting an exclusive target is set (S901). If no exclusive item name is set in S901 (no from S901), the transaction acquiring processing unit 610 receives an instruction from a designer or an upper system of the distributed processing device 101, and then sets an exclusive item name (S902).

In operation S902, five exclusive item names "A," "B," "C," "D," and "E" are set in the forward proxy device 600. If the forward proxy device 600 determines in S901 that the exclusive item name is set (yes from S901), processing proceeds to S903.

The transaction acquiring processing unit 610 determines whether the transaction data has actually been acquired (S903). In S903, the transaction acquiring processing unit 610 waits on standby for the transaction data (no loop from S903). If it is determined in S903 that the transaction data has been acquired (yes from S903), the transaction acquiring processing unit 610 generates an "exclusive item bit train" in a preparatory operation to check exclusive conditions of the transaction data (S904).

The transaction acquiring processing unit 610 encodes the "exclusive item bit train" generated in S904 into an exclusive identification hash value (S905), and acquires a transaction ID (S906). The transaction ID is a serial number to identify the transaction data from other transaction data, and the order of the acquiring by the transaction acquiring processing unit 610.

The "exclusive item bit train" represents the exclusive item name (record unit) accessed when the transaction data is processed. If the exclusive item bit train corresponding to the exclusive item names "A, B, C, D, and E" is "01011," the transaction data refers to the exclusive item names B, D, and E.

The generated exclusive item bit train "01011" is encoded into an exclusive identification hash value, and is thus "11" in the decimal number system. In the embodiment, the exclusive identification hash value is a decimal number. The exclusive identification hash value may be any representation system, such as the hexadecimal numbering system, as long as it is reversible back to the exclusive item bit train.

The transaction acquiring processing unit 610 then adds to the transaction data item table 602 the exclusive identification hash value encoded in S905 with the transaction ID acquired in S906 as a key (S907). The transaction acquiring processing unit 610 stores onto the pre-sort data table 603 data acquired in accordance with the transaction ID as a key (the transaction data corresponding to process content) (S908).

With the new transaction data acquired, the transaction acquiring processing unit 610 notifies the exclusive item addition processing unit 620 that the transaction data item table 602 and the pre-sort data table 603 have been updated (S909). The series of operations are thus complete.

As described above, the transaction acquiring processing unit 610 acquires at a time the transaction data of the process that is performed on the common database, and then temporarily stores the transaction data on the pre-sort data table 603 before the transaction data is sorted to each process node. Concurrently, the transaction acquiring processing unit 610 performs a preparatory process that prevents the substantially same record from being accessed in the parallel processes of the process nodes in a subsequent phase. The preparatory operation corresponds to the production process performed by the transaction acquiring processing unit 610 to generate the exclusive item bit train to sort the transaction data.

The transaction acquiring processing unit 610 encodes the exclusive item bit train generated from the transaction data into the exclusive identification hash value, and then stores the exclusive identification hash value onto the transaction data item table 602. The encoding process substantially reduces a memory capacity for storing the exclusive item bit train of each transaction data. Even if the transaction data centers on the forward proxy device 600, no overflow takes place. The transaction data is efficiently sorted.

Exclusive Item Addition Processing Unit

Figure 10:
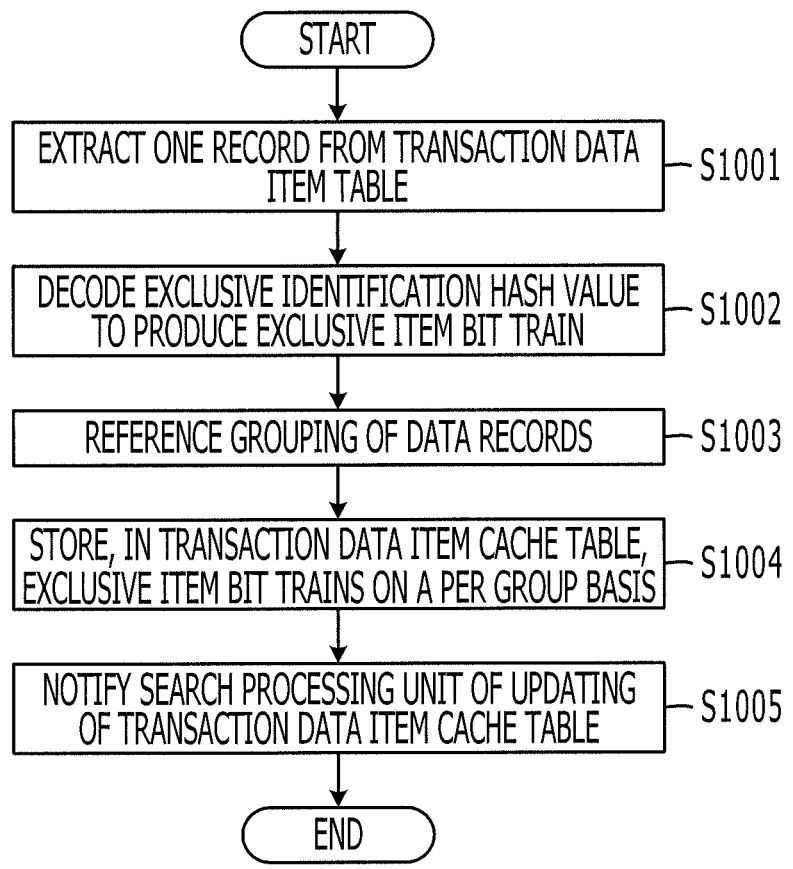
FIG. 10 illustrates a flowchart of a process of an exclusive item addition processing unit.
Figure 11:
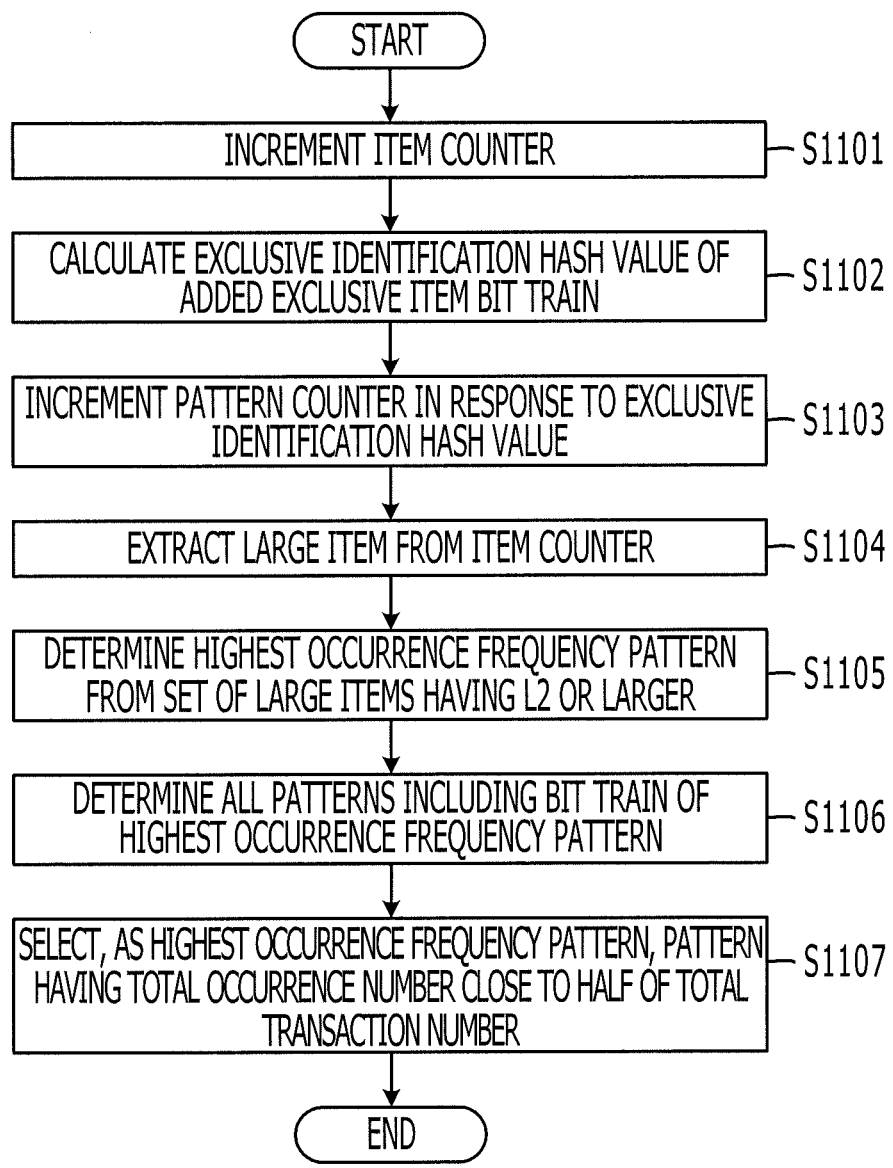
FIG. 11 is a flowchart illustrating a pattern grouping process of sorting unit a data record in response to correlation.
Figure 26:
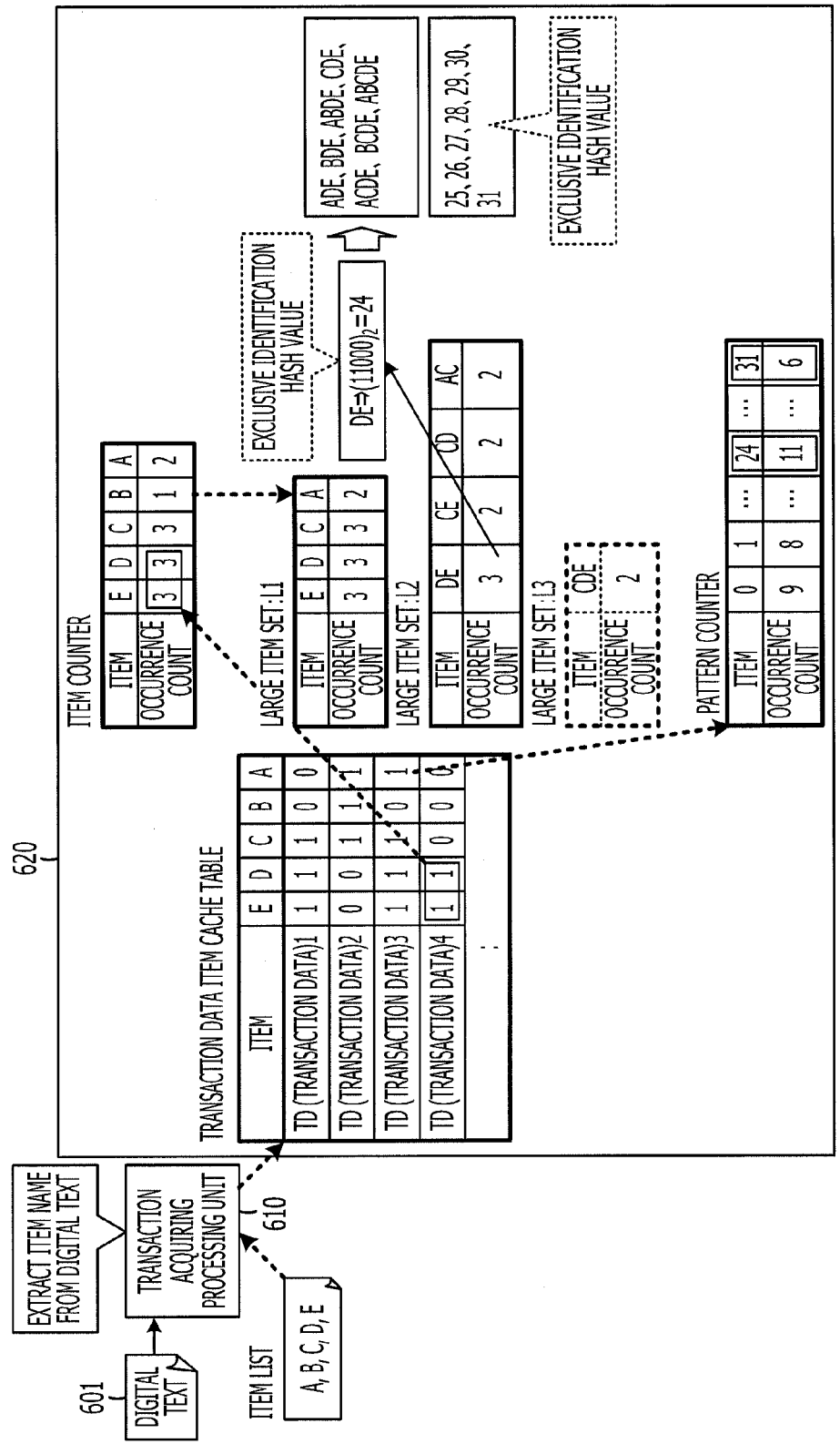
FIG. 26 illustrates a pattern grouping process of the data record in response to correlation.

FIG. 10 is a flowchart illustrating a process of the exclusive item addition processing unit 620. FIG. 11 is a flowchart illustrating a pattern grouping process of data records in accordance with correlation. FIG. 26 illustrates an example of the pattern grouping process of the data records in accordance with the correlation. In the preparatory process to the process of each process node performed on the transaction data acquired by the transaction acquiring processing unit 610 beforehand, the exclusive item addition processing unit 620 adds to the transaction data item table 602 the transaction data together with the exclusive item bit train.

In the process of the exclusive item addition processing unit 620, information related to the frequency of the exclusive item name included in the transaction data greatly affects the sorting unit of the transaction data to the process node. The exclusive item addition processing unit 620 sorts the transaction data including a pattern of the exclusive item name having the highest frequency such that the transaction data is processed by a particular process node with the highest priority.

To assist in the sorting unit process, the exclusive item addition processing unit 620 stores on the transaction data item table 602 the transaction data including the pattern of the exclusive item name having the highest frequency in a manner different from the other transaction data. The process flow of the exclusive item addition processing unit 620 is described with reference to FIG. 10, and the grouping of the data records is described with reference to FIGS. 11 and 26.

The exclusive item addition processing unit 620 extracts one record from the transaction data item table 602 (S1001). The extraction operation in S1001 is performed if a notification notifying of the update of the transaction data item table 602 and the pre-sort data table 603 is received from the transaction acquiring processing unit 610 and if an empty cell is created in a transaction data item cache table. Even if the notification is received from the transaction acquiring processing unit 610, a standby state continues until an empty cell is created in the transaction data item cache table.

FIG. 12 illustrates a storage example of the transaction data item cache table. The transaction data item cache table is a fast-access cache table. The transaction data item cache table lists the exclusive item bit trains, each produced for each transaction data responsive to the transaction ID on a per transaction ID basis.

If the exclusive item bit train is stored in the transaction data item cache table, the grouping process is performed to (a), (b), and (c) in response to the frequency of the exclusive item name. The exclusive item bit trains stored in the transaction data item cache table are not arranged in the ascending order or descending order of the values of the transaction IDs if viewed from all the records. If viewed from the grouped records of (a), (b), and (c), the exclusive item bit trains are arranged in the ascending order or descending order. The age of the acquiring timing of each record may be identified by referring to the transaction ID as previously discussed. The arrangement of the exclusive item bit trains does not necessarily agree with the insertion order as in FIG. 12.

The upper limit may be set on the capacity of each of the groups (a), (b), and (c) in the transaction data item cache table. In one embodiment, the total number of exclusive item bit trains in the groups (a)+(b) equals the total number of exclusive item bit trains in the group (c). By making adjustments as described above, the search processing unit 630 to be discussed later extracts the exclusive item bit trains of each of the groups (a), (b), and (c) in a balanced fashion. The execution timing of the group synchronization is thus postponed.

The transaction data item cache table of FIG. 12 lists bit trains representing node attributes of process nodes (such as the process nodes "1," "2," and "3"). The node attribute is a bit train representing a node that has processed the transaction data corresponding to a record.

The exclusive item addition processing unit 620 decodes the exclusive identification hash value of the record extracted in S1001 to generate the exclusive item bit train (S1002). The operation in S1002 restores the exclusive identification hash value (decimal number) mapped to the transaction ID back to the exclusive item bit train (binary number) generated in S904 (see FIG. 9).

The exclusive item addition processing unit 620 references the grouping of the data records in the pre-process (S1003). The data records are grouped into three patterns depending on the frequency of occurrences of the exclusive item names within the transaction data as described below. In order to perform an efficient distributed processing process, the pattern grouping may reflect a tendency of the process performed in response to the immediately preceding transaction data (for example, as processes needing access to the exclusive item names xx or yy are frequent). The tendency of the lately acquired transaction data is reflected by performing the pattern grouping every specific intervals. The pre-process in S1003 is described in detail with reference to FIGS. 11 and 26.

(a) Data record including only the highest frequency of occurrence pattern, (b) Data record including the highest frequency of occurrence pattern (excluding (a)), and (c) Data record excluding the highest frequency of occurrence pattern The exclusive item addition processing unit 620 inserts in the transaction data item cache table the exclusive item bit train with the transaction ID serving as a key on a per group basis of the groups (a), (b), and (c) referenced in S1003 (S1004).

FIG. 13 illustrates an inserted example of the exclusive item bit train. In S1002, the exclusive item bit train may be generated from a hash value mapped to the transaction ID: 34. It is thus determined in S1003 that the transaction ID: 34 is within the group (a). As illustrated in FIG. 13, an exclusive item bit train 1310 is inserted into the group (a) in the transaction data item cache table. The exclusive item bit train 1310 thus added is the transaction data unprocessed by any process node. The bit train of the attribute node is 000.

Returning the description of FIG. 10, the operation in S1004 is complete. The exclusive item addition processing unit 620 notifies the search processing unit 630 of the updating of the transaction data item cache table in S1004 (S1005). The series of operations is complete.

Pattern Grouping of the Data Records

The pattern grouping of the data records is described as illustrated in FIGS. 11 and 26. The exclusive item addition processing unit 620 determines whether the data record stored in the transaction data item cache table (a combination of the transaction ID and the exclusive item bit train) matches any pattern set in each of the groups (a), (b), and (c).

Referring to FIG. 11, the exclusive item addition processing unit 620 increments an item counter if a data record is newly added in the transaction data item cache table (S1101). As illustrated in FIG. 26, the item counter counts an item name having a bit set in the exclusive item bit train represented by the data record. If transaction data 4 (referred to as TD 4) corresponding to transaction ID: 4 is added as a new data record as illustrated in FIG. 26, the item counter counts the exclusive item names E and D.

The exclusive item addition processing unit 620 determines the exclusive identification hash value of the exclusive item bit train if the record is added to the transaction data item cache table (S1102), and increments a pattern counter in response to the determined exclusive identification hash value (S1103). The pattern counter, unlike the item counter, counts an occurrence of a pattern of the exclusive item bit train rather than counting exclusive item names.

The exclusive item addition processing unit 620 extracts a large item from the item counter in accordance with the apriori algorithm (S1104). The large item is an item satisfying a specific condition (for example, a value half the number of counts of total units of transaction data), from among the cumulative value of the counts counted by the item counter. As illustrated in FIG. 26, the exclusive item addition processing unit 620 extracts a "large item population: L1" with the count of the item counter serving as a population. The item names A, C, D, and E are extracted as the "large item set: L1" through the extraction.

The apriori algorithm evaluates a rule set in accordance with reliability and support. The exclusive item addition processing unit 620 performs an extraction process by setting the rule that extracts an item name having the frequency of occurrence equal to or above a specific value. The apriori algorithm is related art, and is not discussed in detail here.

As illustrated in FIG. 26, the exclusive item addition processing unit 620 extracts a "large item set: L2" in view of two item names with the "large item set: L1" serving as a population. Item names AC, CD, CE, and DE are extracted as the large item set: L2. The exclusive item addition processing unit 620 determines the highest frequency of occurrence pattern from the large item set L2 or larger (S1105).

As illustrated in FIG. 26, a pattern including DE as the highest frequency of occurrence item is extracted from "large item set: L2." DE represents the exclusive item bit train "11000" and is "24" if represented in the exclusive identification hash value. The exclusive item addition processing unit 620 determines all patterns including the bit train having the highest frequency of occurrence determined in the extraction results in S1105 (S1106).

All patterns including the bit train having the highest frequency of occurrence mean all the patterns of the exclusive item names including DE. For example, xxxDE with any bit of a portion of xxx including a set bit is eligible. Eligible item names are "ADE, BDE, ABDE, CDE, ACDE, BCDE, and ABCDE. The exclusive identification hash values of the item names are "25, 26, 27, 28, 29, 30, and 31."

If a plurality of highest frequency of occurrence patterns is present, the exclusive item addition processing unit 620 references the pattern counter and selects, as the highest frequency of occurrence pattern, a pattern having the total number of occurrences of the previous process equal to half the total number of transaction actions (S1107). As illustrated in FIG. 26, pattern 24 having a count value of 11 on the pattern counter ("11000" in the case of the exclusive item bit train) is selected as the highest frequency of occurrence pattern.

The group (a) has a bit train pattern of "11000." The group (b) has bit train patterns of "11xxx," "10xxx" and "01xxx" excluding the group (a). The group (c) has the bit train patterns excluding the groups (a) and (b).

As described above, the exclusive item addition processing unit 620 adds to the transaction data item cache table the exclusive item bit train of the newly acquired transaction data together with the transaction ID The exclusive item addition processing unit 620 stores on the transaction data item cache table the exclusive item bit train not directly but on a group basis of the groups responsive to the frequency of occurrence of the exclusive item names. For example, the newly acquired transaction data is registered, as one unit of the transaction data as a sort target to be sorted to each process node, on a per pattern basis of the patterns indicated by the exclusive item bit train.

Search Processing Unit

Figure 14:
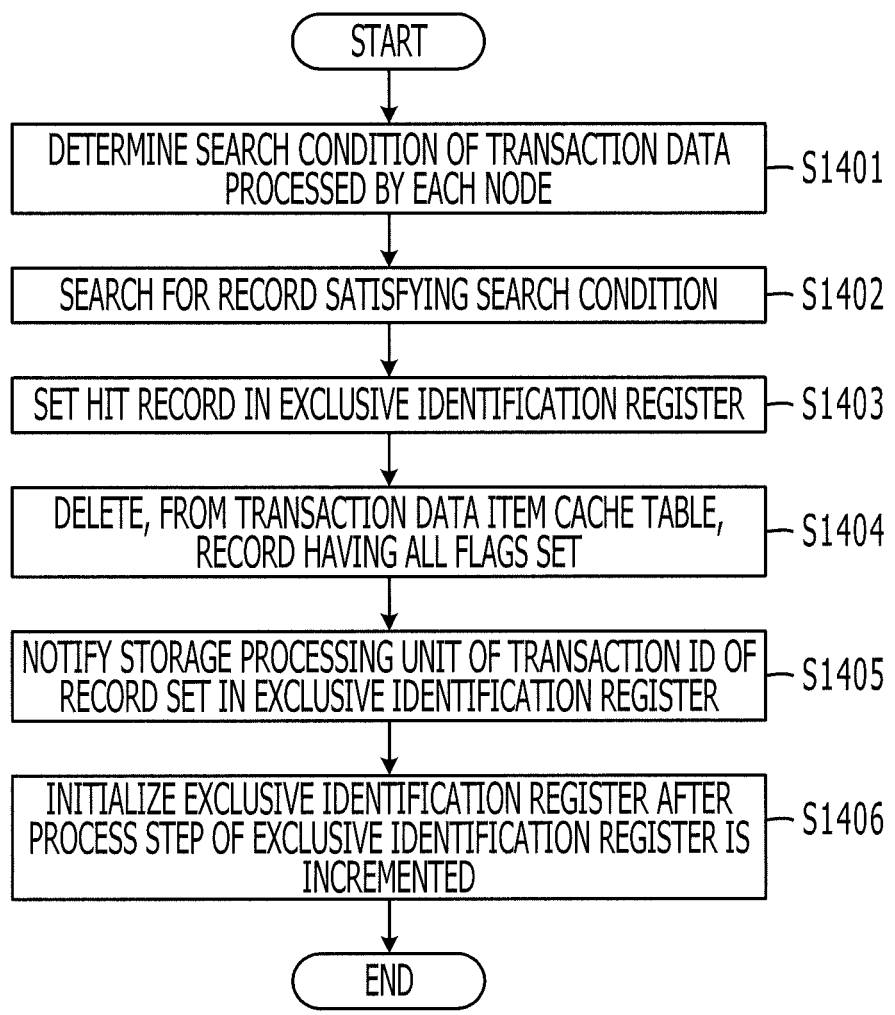
FIG. 14 is a flowchart illustrating a process of a search processing unit.

FIG. 14 is a flowchart of a process of the search processing unit 630. Using the transaction identification register, the search processing unit 630 searches for the transaction ID of the transaction data processed in the substantially same process by the process nodes "1," "2," and "3" from among the transaction IDs stored on the transaction data item cache table.

The exclusive item bit train is to be set in the exclusive identification register. To this end, the search processing unit 630 determines a search condition of the transaction data to be processed by the process nodes "1," "2," and "3" (S1401). With respect to the transaction data item cache table, the search processing unit 630 determines, as the search condition, the age of the storage timing, the grouping results, the exclusive item bit train, and the bit train of the attribute node from the exclusive item bit train. The search condition is described below in detail.

The search processing unit 630 searches the transaction data item cache table for a record satisfying the search condition determined in S1401 (S1402). The search processing unit 630 sets the record hit in S1402 on the exclusive identification register (S1403). After setting the record on the exclusive identification register in S1403, the search processing unit 630 updates a node attribute flag of the set record, and deletes the record having all flags set from the transaction data item cache table (S1404).

Figure 15:
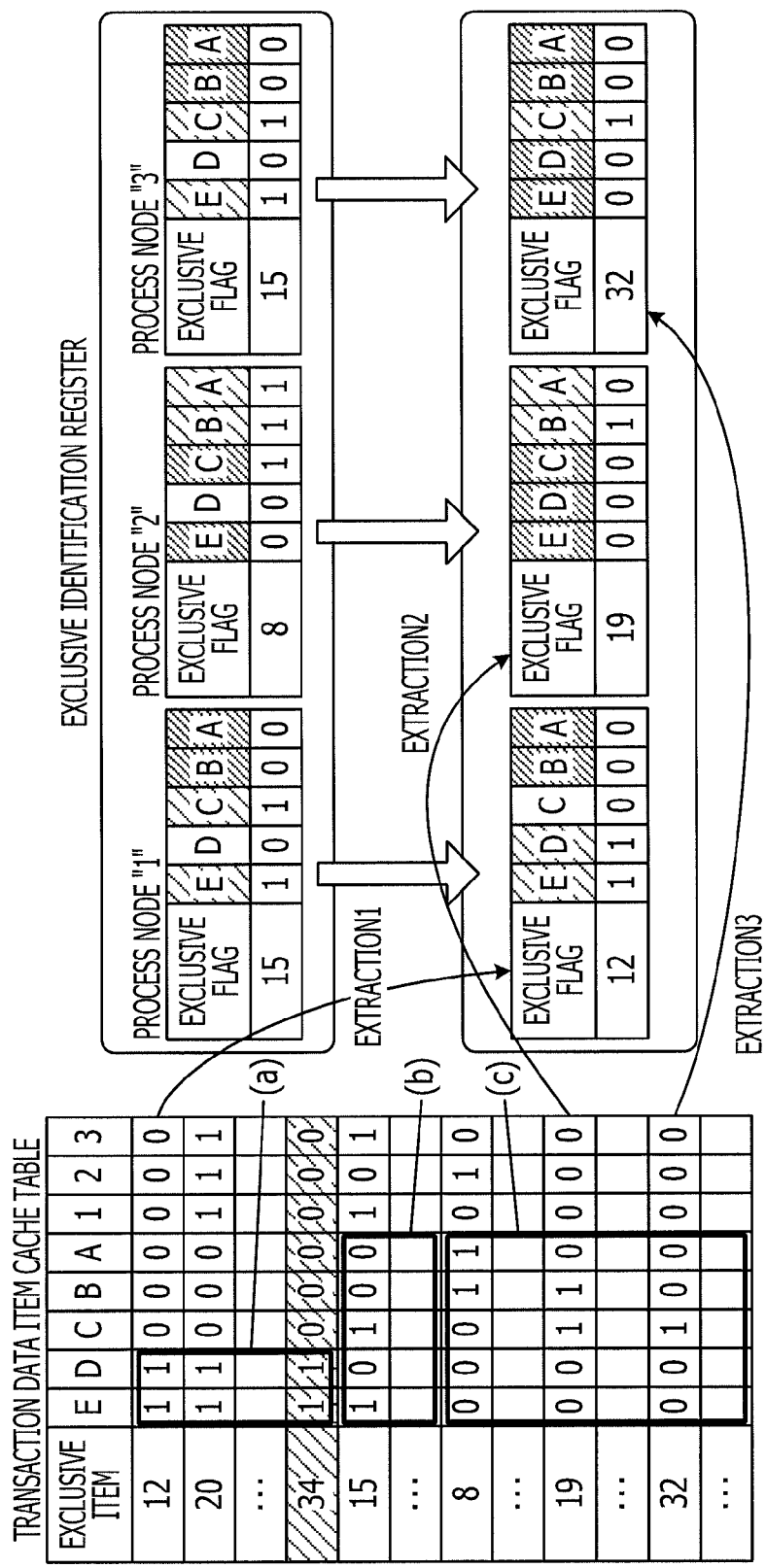
FIG. 15 illustrates a record extraction process of a process node.

FIG. 15 illustrates a record extraction process performed by each process node. Operations S1401-S1404 are discussed with reference to FIG. 15. As illustrated in FIG. 15, the exclusive identification register is arranged on a per process node basis. FIG. 15 illustrates two processes (a previous process and a current process) set the exclusive identification register. The upper portion of FIG. 15 illustrates the setting on the exclusive identification register in the previous process, and the lower portion of FIG. 15 illustrates the setting on the exclusive identification register in the current process.

In response to the search condition, the search processing unit 630 sets the exclusive item bit train on each process node. In the process node "1," no flag is set in an attribute bit in the group (a) or the group (b), and the exclusive item bit train corresponding to the oldest transaction data stored on the transaction data item cache table is set. Once the group (a) is set in the process node "1," another exclusive item bit train in the group (a) satisfying the above condition is set with a higher priority until the next group synchronization. Set in a process node other than the process node "1" is the oldest exclusive item bit train having no competing exclusive item name with another process node and selected from among the exclusive item bit trains of the group (c). If the exclusive item bit train satisfying the search condition is not present, a null value not affecting the synchronization process is set. Set, for example, may be an exclusive item bit train with the flag of the attribute bit of the process node as a destination storage not set from among the set transaction IDs.

The process responsive to the search condition is discussed with reference to FIG. 15. The setting of the exclusive identification register in the previous process illustrated on the upper portion of FIG. 15 is discussed first. In the previous process, no appropriate exclusive item bit train from the group (a) was set in the process node "1." The search processing unit 630 thus sets the exclusive item bit train corresponding to the transaction ID: 15 satisfying the search condition from the group (b).

If an exclusive item bit train in the group (b) instead of a pattern other than the group (a), i.e., a pattern other than the highest frequency of occurrence pattern is set in the process node "1," a process having no duplicate record as a process target is set in a remaining process node. The process having no duplicate record as the process target refers to the process in which no duplicate exclusive item bit trains are caused or the attribute bit is not set.

Set in the process node "2" were the exclusive item bit trains corresponding to the transaction ID: 15 and the transaction ID: 8 having no duplicate exclusive item bit trains from the exclusive item bit trains in the group (c). An exclusive item bit train duplicating a set exclusive item bit train is desired in the process node "3", but no appropriate record is present. The search processing unit 630 then sets in the process node "3" the exclusive item bit train corresponding to the transaction ID: 15 having the attribute bit flag not set in the process node "3" at the previous process.

The exclusive item bit train corresponding to the transaction ID: 15 in the transaction data item cache table has the attribute flag bits of the process nodes "1" and "3" set. The setting content of each exclusive identification register is transferred to the storage processing unit 640. The setting content is then initialized and the storage content is cleared to zeroes.

In the current process subsequent to the previous process described above, the search processing unit 630 sets the exclusive item bit train in the exclusive identification register corresponding to the process node "1" in response to the search condition. To start with the process node "1", the exclusive identification register starts with an unset state.

The search processing unit 630 identifies the oldest exclusive item bit train in the group (a) of the transaction data item cache table as an exclusive item bit train in the exclusive identification register corresponding to the process node "1." As described above in the discussion of the transaction acquiring processing unit 610, the transaction ID is serially numbered. The search processing unit 630 thus references the youngest transaction ID within the group (a). The search processing unit 630 then determines whether the identified transaction ID is the oldest transaction data from among the exclusive item bit trains having attribute bit flags not set in the transaction data item cache table.

Referring to FIG. 15, the search processing unit 630 extracts from the transaction data item cache table the transaction ID: 12 from the group (a) in an extraction operation 1. The exclusive item bit train of the extracted transaction ID: 12 is set as the exclusive item bit train corresponding to the process node "1." If the exclusive item bit train of the group (a) is set in the process node "1," the process node "1" becomes a process node that sets the exclusive item bit train in the group (a) with a higher priority until the next group synchronization.

The search processing unit 630 then extracts the transaction IDs: 19 and 32 not competing from the group (c) in the transaction data item cache table in extraction operations 2 and 3. The exclusive item bit trains of the extracted transaction IDs: 19 and 32 are set as the exclusive item bit trains for the process nodes "2," and "3."

Through the current process, a flag is set at the attribute node "A" in the exclusive item bit train corresponding to the transaction ID: 12. Similarly, a flag is set at the attribute node "B" in the exclusive item bit train corresponding to the transaction ID: 19 and a flag is set at the attribute node "C" in the exclusive item bit train corresponding to the transaction ID: 32. At the next update of each exclusive identification register, records having all the set attribute flags are deleted from the transaction data item cache table. In the transaction data item cache table of FIG. 15, the exclusive item bit train corresponding to the transaction ID: 20 is deleted. The process described above is further described in detail.

Returning the discussion of FIG. 14, in parallel the operation with S1404, the search processing unit 630 notifies the storage processing unit 640 of the transaction IDs to be executed by the process nodes "1," "2," and "3" and the process node name (S1405) after setting the exclusive identification register in S1403. Finally, the search processing unit 630 increments the process of the exclusive identification register after the notification operation in S1405 and initializes the exclusive identification register (S1406). The series of operations is thus complete.

As described above, using the exclusive identification register, the search processing unit 630 stores in the process node "1" the transaction data having the highest frequency of occurrence pattern. The search processing unit 630 sets the other transaction data such that the process nodes process the other transaction data in a manner prevents the exclusive item name from being duplicated. When the transaction data and the process node processing the transaction data are set, a younger transaction ID, i.e., older transaction data is set with a higher priority. The waiting time of the transaction data is kept to a minimum.

Storage Processing Unit

Figure 16:
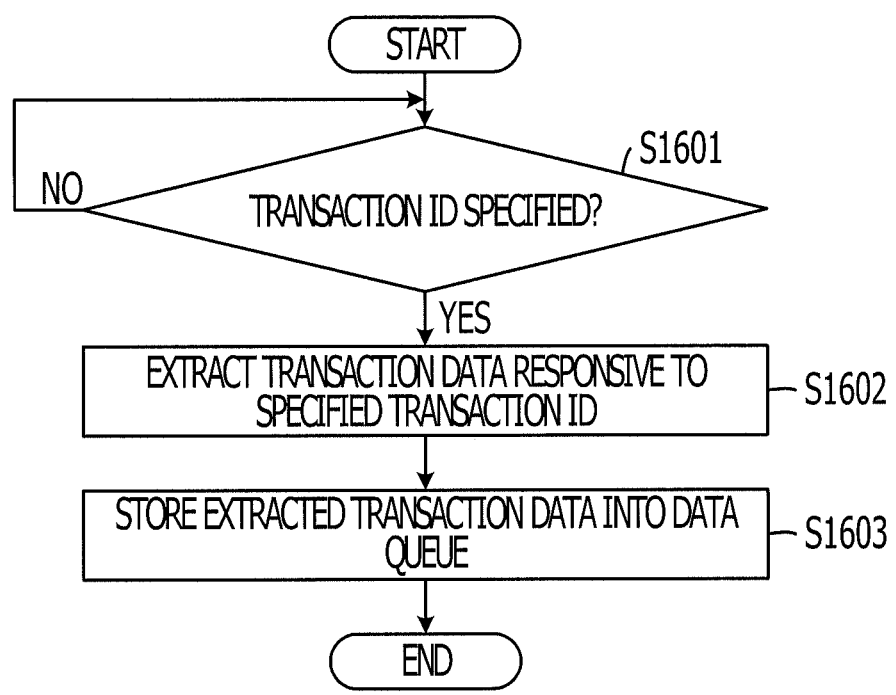
FIG. 16 is a flowchart illustrating a process of a storage processing unit.

FIG. 16 illustrates a flowchart of a process of the storage processing unit 640. The storage processing unit 640 stores on the data queue 604 the transaction data stored on the pre-sort data table 603 (such as the digital text 601) in response to a notification from the search processing unit 630.

The storage processing unit 640 determines whether a transaction ID is specified by the notification from the search processing unit 630 (S1601). The storage processing unit 640 waits on standby until the transaction ID is specified (no loop from S1601). If the transaction ID is specified (yes from S1601), the storage processing unit 640 extracts the transaction data, corresponding to the transaction ID specified in the notification from the search processing unit 630, from among the transaction data stored on the pre-sort data table 603 (S1602).

The storage processing unit 640 stores the transaction data extracted in S1602 on the data queue 604 of the process node name specified in the notification from the search processing unit 630 (S1603). If the process node "1" is specified as a process node of the transaction ID: 1, the transaction data corresponding to the transaction ID: 1 is stored on the data queue 604 of the process node "1."

As described above, the storage processing unit 640 performs the preparatory process such that the transaction data searched for by the search processing unit 630 is processed by each process node. For example, the storage processing unit 640 sorts the transaction data, searched as processes to be performed as the substantially same processes, to the data queue 604 that actually causes the process node to process the transaction data.

Dispatch Processing Unit

Figure 17:
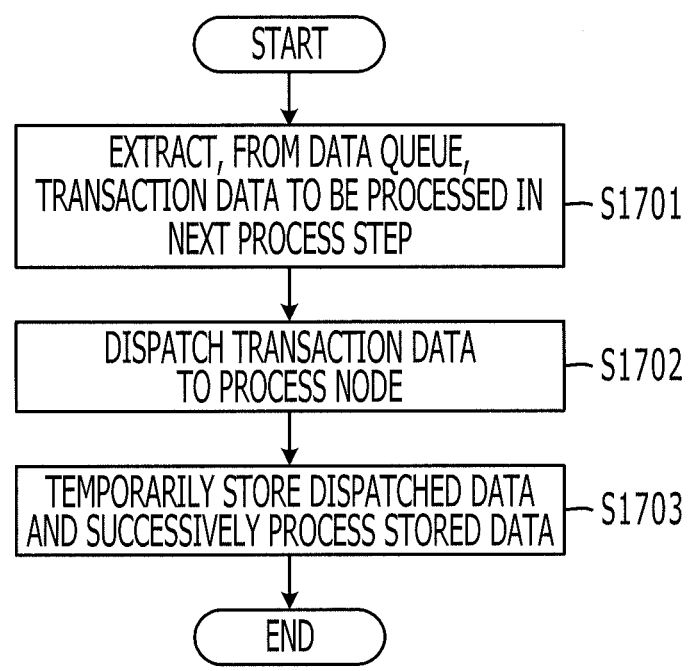
FIG. 17 is a flowchart illustrating a process of a dispatch processing unit.

FIG. 17 is a flowchart of a process of the dispatch processing unit 650. The dispatch processing unit 650 has a dispatch function of causing the process node to perform a transaction stored on the data queue 604.

The dispatch processing unit 650 extracts from the data queue 604 all data to be processed in a next process (S1701). For example, the dispatch processing unit 650 extracts data actually used in the next process, i.e., the transaction data from the storage processing unit 640 storing the data actually used in the next process, from among the data queues 604 corresponding to the process node "1," the process node "2," and the process node "3."

The dispatch processing unit 650 dispatches the transaction data extracted from the data queue 604 to each process node (S1702). Finally, the dispatch processing unit 650 causes a data queue in each process node to store the dispatched data temporarily. The dispatch processing unit 650 enables the process nodes to perform the processes successively (S1703). The series of operations is thus complete.

As described above, the dispatch processing unit 650 dispatches the transaction data stored on the data queue 604 to the process nodes at a common timing. The process nodes thus perform the processes thereof.

If the group (a) including the exclusive item name having the highest frequency of occurrence is set in the process node "1," the forward proxy device 600 causes the process nodes other than the process node "1" to perform the partial synchronization process as long as an exclusive item bit train satisfying the specific condition is present in the group (a). If no exclusive item bit train satisfying the condition is present in the group (a), the process node "1" becomes an empty node. The forward proxy device 600 performs the group synchronization mode to complete the synchronization process for the transaction data for the group (a).

The exclusive item bit train corresponding to the transaction data subsequent to the completion of the synchronization process is deleted from the transaction data item cache table. The process of the subsequent transaction data is performed. Described in detail below is the process content of the search processing unit 630 and the storage processing unit 640 in each of the partial synchronization mode and the group synchronization mode. In the discussion that follows, four process nodes are prepared in view of a variety installation examples.

Partial Synchronization Mode

FIGS. 18A-18D illustrate storage processes to the exclusive identification register in the partial synchronization mode. Once the exclusive item bit train of the group (a) is set in the process node "1," the partial synchronization mode continues until an unprocessed exclusive item bit train satisfying the condition is no longer present in the group (a) of the transaction data item cache table.

FIGS. 18A-18D illustrate the storage process. In the storage process, the exclusive item bit trains stored on the transaction data item cache table are stored on the exclusive identification register, and the partial synchronization continues while processing proceeds to process 8. Processing then shifts into the group synchronization mode. Discussed below on a process by process basis are determination operations according to which the exclusive item bit trains are stored on each exclusive identification register.

The storage process on the exclusive identification register is based on determination criteria as to whether the following conditions are satisfied or not: condition (A): group (a), oldest bit train, value of the node attribute of a target process node being 0, and no duplicate exclusive item name; condition (B): group (b), oldest bit train, node attribute of a target process node being 0, and no duplicate exclusive item name; and condition (C): group (c), oldest bit train, node attribute of a target process node being 0, and no duplicate exclusive item name.

The condition "oldest bit train" herein excludes the bit train stored in another process node in the substantially same process.

Process 1

Figure 18A:
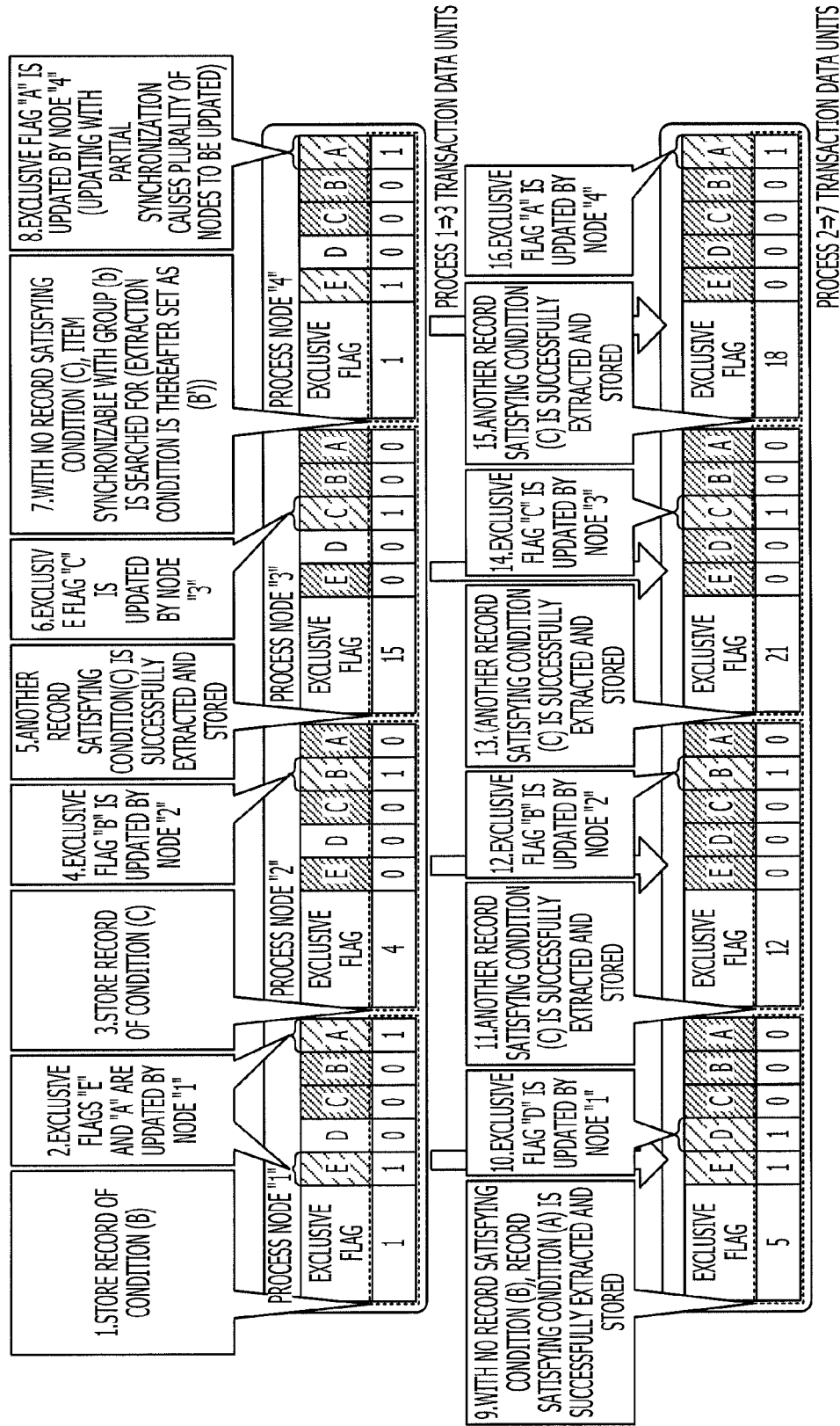
FIGS. 18A-18D illustrate a storage process of storing a record on an exclusive identification register in a partial synchronization mode.

FIG. 18A illustrated process 1. In operation 1 in process 1, a record satisfying condition (B) (the exclusive item bit train) is stored. In operation 2, exclusive flags "E," and "A" are updated by the process node "1." In operation 3, a record satisfying condition (C) is stored on the exclusive identification register of the process node "2." In operation 4, exclusive flag "B" is updated by the process node "2." In operation 5, another record satisfying condition (C) is successfully extracted. In operation 6, exclusive flag "C" is updated by the process node "3." In operation 7, since no other record satisfying condition (C) is present, another record synchronizable with the group (b) is extracted (the extraction condition is hereinafter referred to as (B')). In operation 8, exclusive flag "A" is updated by the process node "4."

Through the above process, three transaction data units have been process. In operation 8, a plurality of nodes are updated if flags are updated in the partial synchronization.

Process 2

In operation 9 of process 2 of FIG. 18A, a record satisfying condition (A) is stored because no record satisfying condition (B) is present. In operation 10, exclusive flag "D" is updated by the process node "1." In operation 11, another record satisfying condition (C) is successfully extracted. In operation 12, exclusive flag "B" is updated by the process node "2." In operation 13, another record satisfying condition (C) is successfully extracted. In operation 14, exclusive flag "C" is updated by the process node "3." In operation 15, another record satisfying condition (C) is successfully extracted. In operation 16, exclusive flag "A" is updated by the process node "4."

Through process 2, 4 new transaction data units are processed. A total of 7 transaction data units have been now processed.

Process 3

Figure 18B:
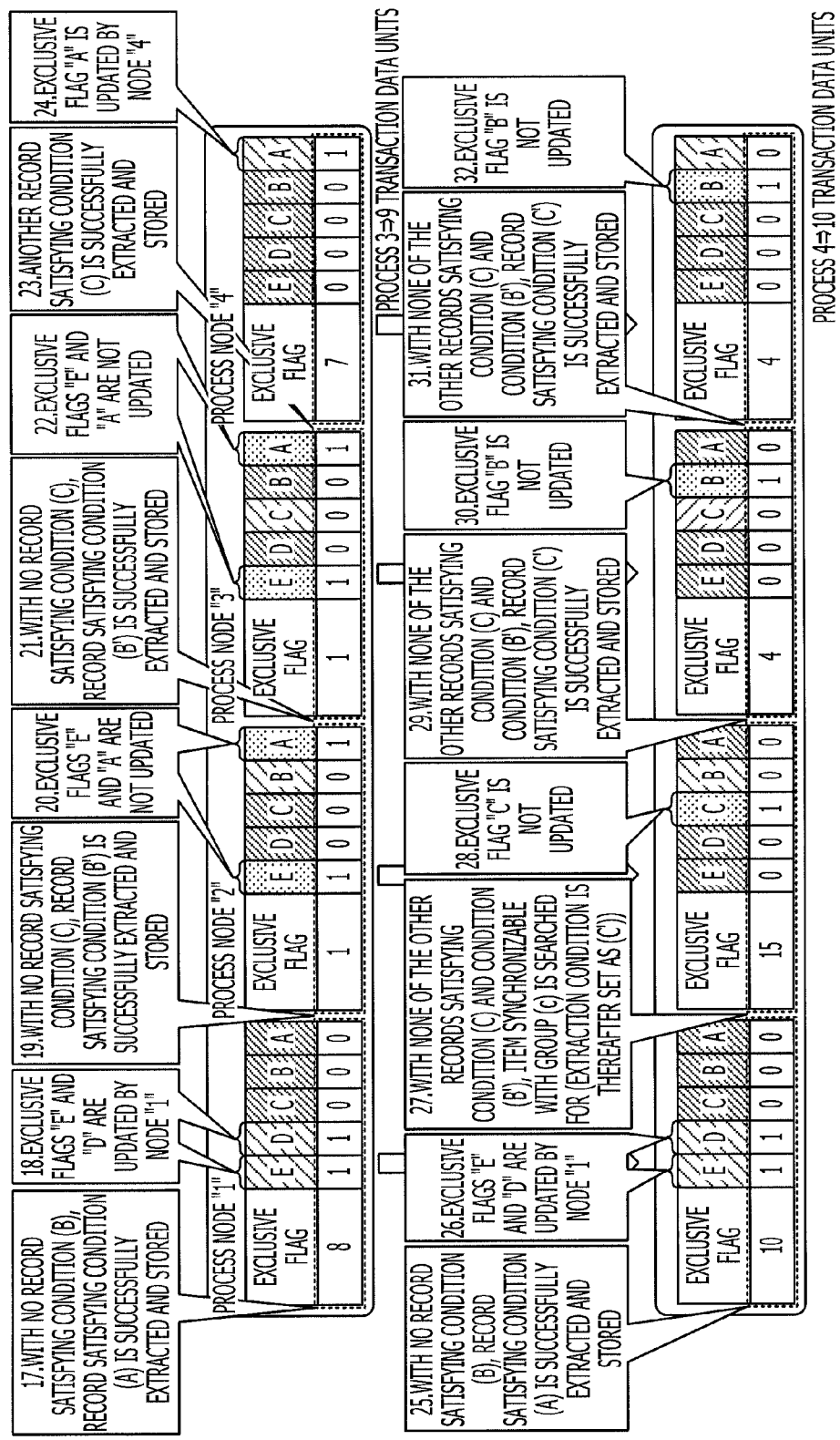

FIG. 18B illustrates process 3. In operation 17 in process 3, a record satisfying condition (A) is stored because no record satisfying condition (B) is present. In operation 18, exclusive flags "E" and "D" are updated by the process node "1." In operation 19, a record satisfying condition (B') is stored because no record satisfying condition (C) is present. In operation 20, exclusive flags "E" and "A" are not updated (because the transaction data is stored). In operation 21, a record satisfying condition (B') is stored because no record satisfying condition (C) is present. In operation 22, exclusive flags "E" and "A" are not updated. In operation 23, another record satisfying condition (C) is successfully extracted. In operation 24, exclusive flag "A" is updated by the process node "4."

Through process 3, 2 new transaction data units are processed. A total of 9 transaction data units have been now processed.

Process 4

FIG. 18B illustrates process 4. In operation 25 in process 4, a record satisfying condition (A) is stored because no record satisfying condition (B) is present. In operation 26, exclusive flags "E" and "D" are updated by the process node "1." In operation 27, another record synchronizable with the group (c) is extracted because none of the other records satisfy condition (C) and condition (B') is present (this extraction condition is hereinafter referred to as condition (C')). In operation 28, exclusive flag "C" is not updated (the transaction data is stored). In operation 29, a record satisfying condition (C') is stored because no record satisfying condition (B') is present (the transaction data is stored). In operation 30, exclusive flag "B" is not updated (the transaction data is stored). In operation 31, a record satisfying condition (C') is stored because no record satisfying conditions (C) and (B') is present (the transaction data is stored). In operation 32, exclusive flag "B" is not updated.

Through process 4, a new transaction data unit is processed. A total of 10 transaction data units have been processed.

Figure 18C:
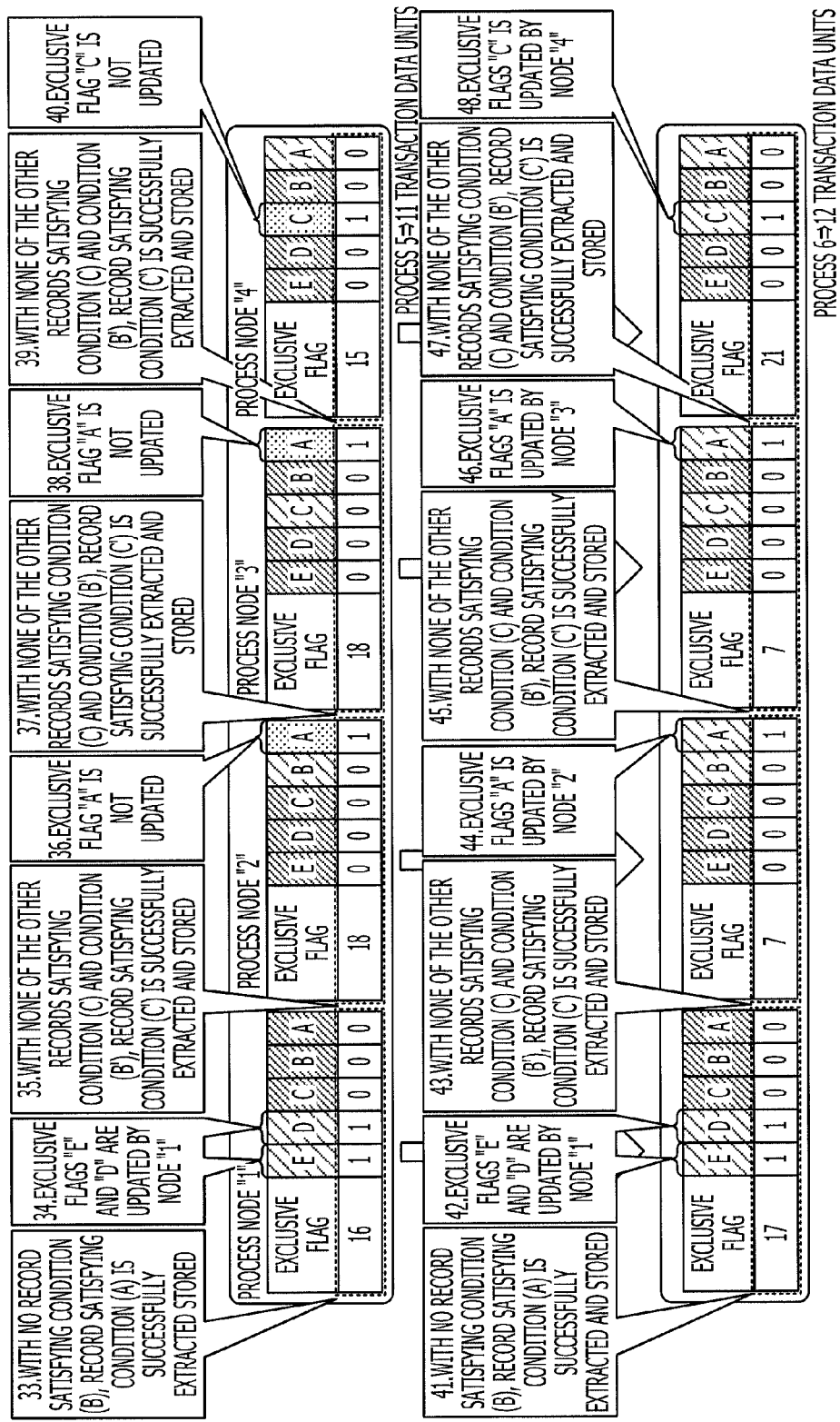

In operations 33-40 of process 5 of FIG. 18C, 1 transaction data unit is processed by the exclusive identification register corresponding to the process node "1." A total of 11 transaction data units have been processed. Through operations 41-48 of process 6 of FIG. 18C, one transaction data unit is processed by the exclusive identification register corresponding to the process node "1." A total of 12 transaction data units have been processed.

Figure 18D:
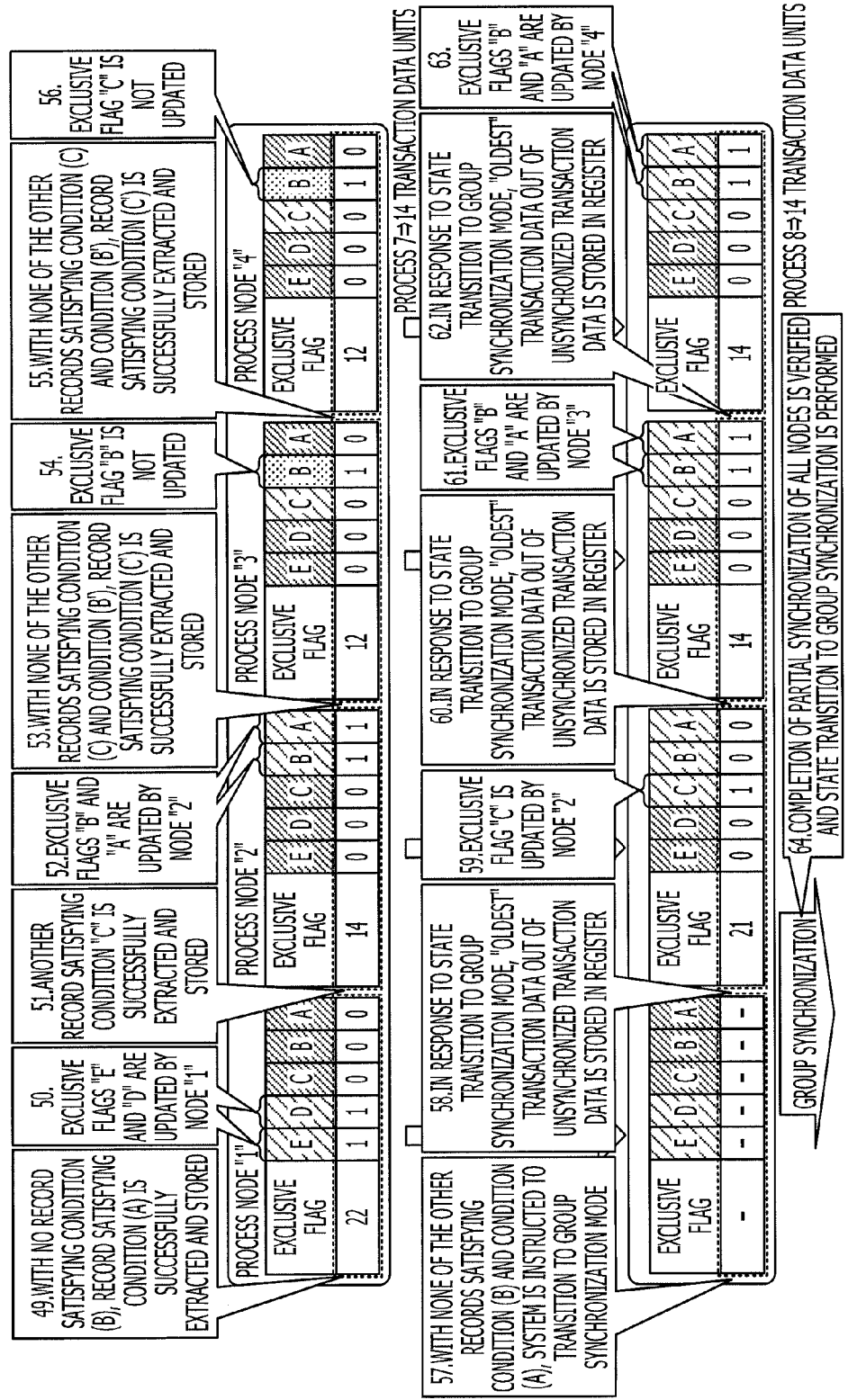

Similarly, through operations 49-56 of process 7 of FIG. 18D, 2 transaction data units are processed by the exclusive identification registers corresponding to the process nodes "1" and "2." A total of 14 transaction data units have been processed.

Through operations 57-64 in process 8 of FIG. 18D, no record is stored on the exclusive identification register corresponding to the process node "1". A state transition instruction to the group synchronization mode is issued. In response to the state transition instruction issued in operation 57, the exclusive identification register corresponding to another process node stores the oldest transaction data from among the unsynchronized transaction data. Through process 8, no transaction data unit is processed, and the state transition to the group synchronization mode is performed.

Figure 19A:
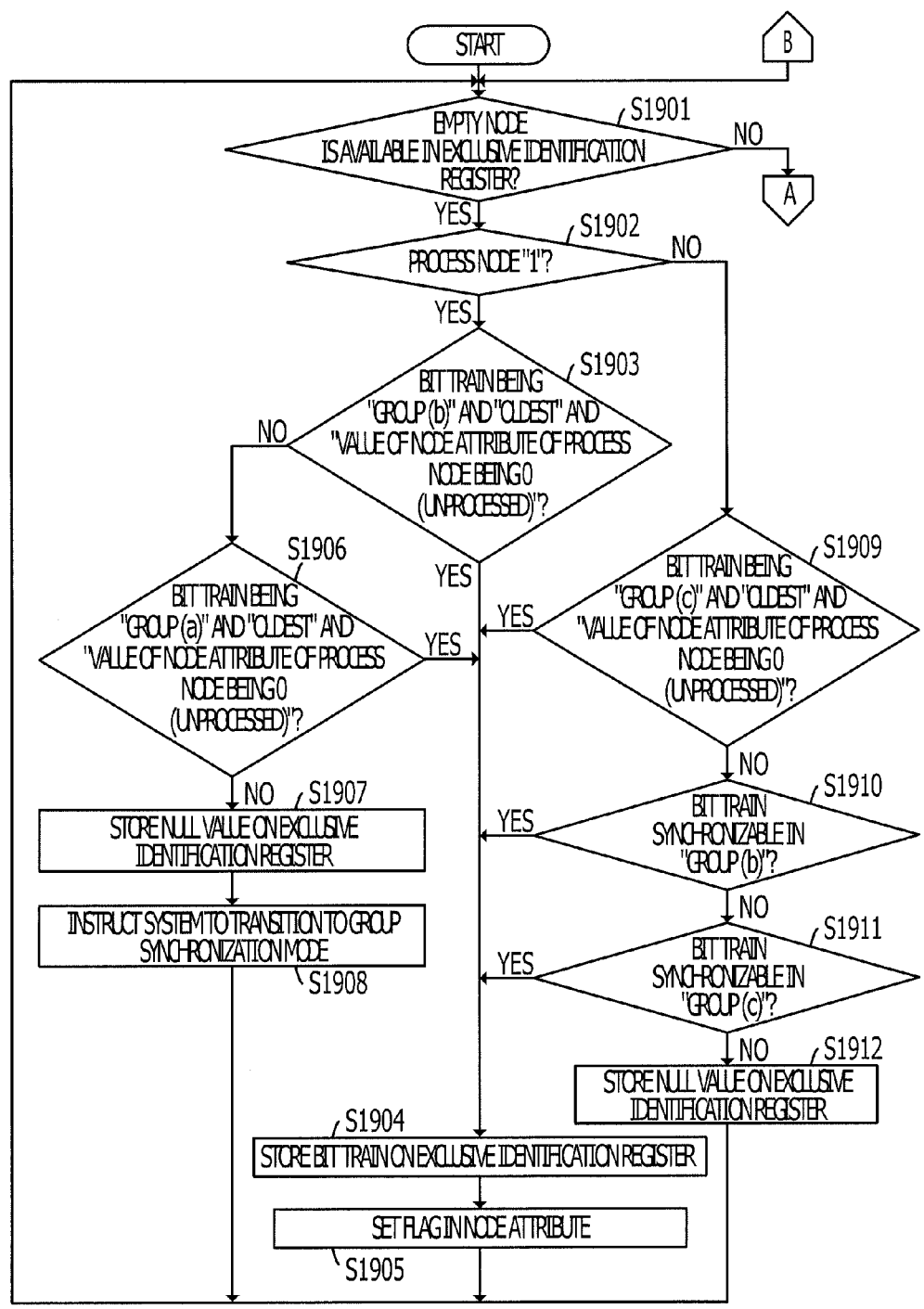
FIGS. 19A and 19B are a flowchart illustrating a storage process of storing the record on the exclusive identification register in the partial synchronization mode.
Figure 19B:
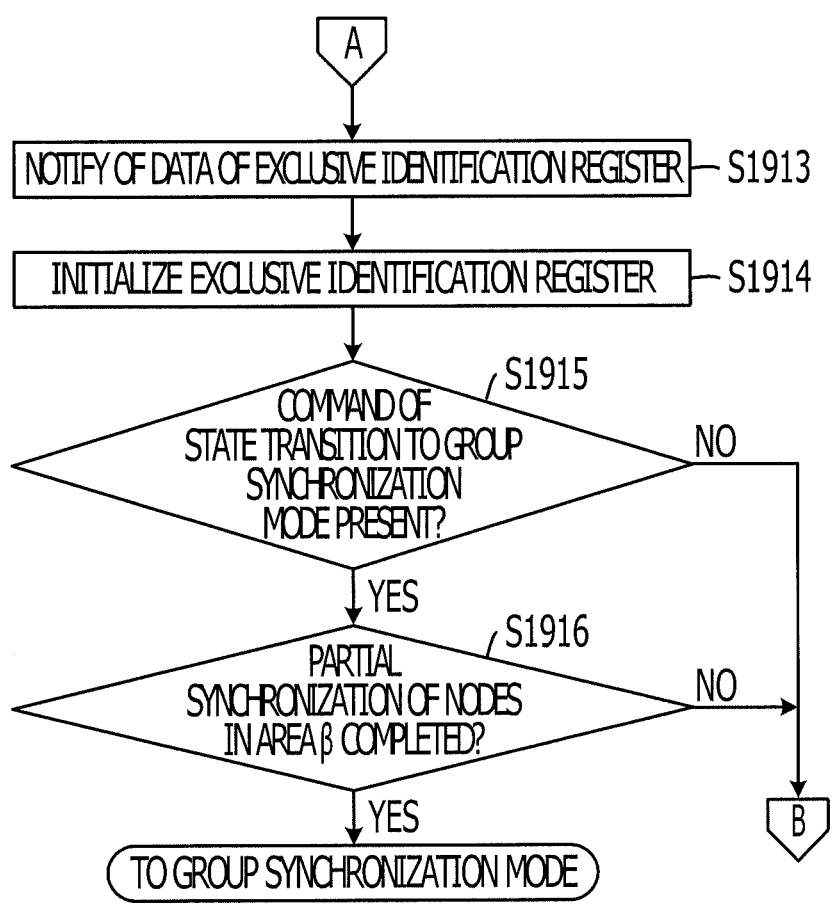

FIGS. 19A and 19B are a flowchart illustrating a storage process of the exclusive identification register in the partial synchronization mode. The determination operations of FIGS. 18A-18D, if generalized, become the flowchart of FIGS. 19A and 19B. By executing operations of FIGS. 19A and 19B, the exclusive item bit train satisfying the specific search condition is stored on the exclusive identification register as illustrated in FIGS. 18A-18D.

As illustrated in FIG. 19A, the search processing unit 630 determines whether an empty node is available in the exclusive identification register (S1901). If it is determined in S1901 that an empty node is available (yes from S1901), the search processing unit 630 determines whether the empty node is the process node "1" (S1902). If it is determined in S1901 that no empty node is available (no from S1901), the search processing unit 630 proceeds to S1913 of FIG. 19B.

If it is determined in S1902 that an empty node is the process node "1" (yes from S1902), the search processing unit 630 proceeds to a process to store the exclusive item bit train on the process node "1." The search processing unit 630 first determines whether a process target record is an exclusive item bit train of "group (b)," and "oldest bit train," and "node attribute of a target process node being 0 (unprocessed)" (S1903). The group (b) has attributes of both the groups (a) and (c). Without performing the determination operation on the group (b), the group (b) remains unselected as a process target until the group synchronization mode. For this reason, the determination operation is performed the group (b) with a higher priority such that processing advances smoothly.

The record as the process target is not a record within the common database accessed by the process node, but a record within a record group representing the exclusive item bit train stored on the transaction data item cache table.

The oldest bit train in S1903 refers to an exclusive item bit train having the youngest transaction ID from among the exclusive item bit trains stored on the transaction data item cache table. If it is determined in S1902 that the empty node is not the process node "1" (no from S1902), processing proceeds to a process to determine the search condition related to the exclusive item bit train to be stored on another process node (S1909-S1911).

If it is determined in S1903 that the process target record is an exclusive item bit train of "group (b)," and "oldest bit train," and "value of the node attribute of a target process node being 0 (unprocessed)" (yes from S1903), the search processing unit 630 determines that the exclusive item bit train to be stored in the process node "1" is determined from among the group (b). The search processing unit 630 stores the exclusive item bit train of the record as a current process target on the exclusive identification register together with the transaction ID (S1904). The search processing unit 630 sets the flag of the node attribute (S1905), and proceeds to S1901 to perform the storage process on another process node.

If it is determined in S1903 that the process target record is not an exclusive item bit train of "group (b)," and "oldest bit train," and "value of the node attribute of a target process node being 0 (unprocessed)" (no from S1903), the search processing unit 630 determines whether the process target record is an exclusive item bit train of "group (a)," and "oldest bit train," and "value of the node attribute of a target process node being 0 (unprocessed)" (S1906).

If it is determined in S1906 the process target record is an exclusive item bit train of "group (a)," and "oldest bit train," and "value of the node attribute of a target process node being 0 (unprocessed)" (yes from S1906), the search processing unit 630 determines that the exclusive item bit train to be stored in the process node "1" is determined from among the group (a). The search processing unit 630 stores the exclusive item bit train of the record as a current process target on the exclusive identification register together with the transaction ID (S1904). The search processing unit 630 sets the flag of the node attribute (S1905), and proceeds to S1901 to perform the storage process on another process node.

If it is determined in S1906 the process target record is not an exclusive item bit train of "group (a)," and "oldest bit train," and "value of the node attribute of a target process node being 0 (unprocessed)" (no from S1906), the search processing unit 630 determines that no exclusive item bit train to be stored in the process node "1" is present. The search processing unit 630 stores a null value on the exclusive identification register of the process node "1" (S1907). The search processing unit 630 instructs the system to transition to the group synchronization mode (S1908), and then proceeds to S1901 to perform the storage process on another process node.

If it is determined in S1902 that the empty node is not the process node "1" (no from S1902), the search processing unit 630 proceeds to a process to identify the exclusive item bit train to be stored on the other process node. The search processing unit 630 determines first whether the process target record is an exclusive item bit train of "group (c)," and "oldest bit train," and "value of the node attribute of a target process node being 0 (unprocessed)" (S1909).

If it is determined in S1909 that the process target record is an exclusive item bit train of "group (c)," and "oldest bit train," and "value of the node attribute of a target process node being 0 (unprocessed)" (yes from S1909), the search processing unit 630 determines that the exclusive item bit train to be stored in the process node "1" is determined from among the group (c). The search processing unit 630 stores the exclusive item bit train of the record as a current process target on the exclusive identification register together with the transaction ID (S1904). The search processing unit 630 sets the flag of the node attribute (S1905), and proceeds to S1901 to perform the storage process on another process node.

If it is determined in S1909 that the process target record is not an exclusive item bit train of "group (c)," and "oldest bit train," and "value of the node attribute of a target process node being 0 (unprocessed)" (no from S1909), the search processing unit 630 determines whether the record as a process target is processed in a parallel operation with a process node other than the process node "1." The search processing unit 630 determines whether the record as the process target is the bit train synchronizable with the group (b) (S1910).

If it is determined in S1910 that the record as the process target is the bit train synchronizable with the group (b) (no from S1910), the search processing unit 630 further determines whether the record as the process target is the bit train synchronizable with the group (c) (S1911).

It is determined in one of S1910 and S1911 that the record as the process target is the synchronizable bit train (yes from S1910 or yes from S1911), the search processing unit 630 determines that the exclusive item bit train to be stored in a process node other than the process node "1" is determined from among the group (c). The search processing unit 630 stores the exclusive item bit train of the record as the current process target on the exclusive identification register together with the transaction ID (S1904). The search processing unit 630 sets the flag of the node attribute (S1905), and proceeds to S1901 to perform the storage process on another process node.

It is determined in S1910 and S1911 that the record as the process target is not the synchronizable bit train (no from S1910 and no from S1911), the search processing unit 630 determines that there is no appropriate exclusive item bit train appropriate to be stored on a process node other than the process node "1." The search processing unit 630 stores a null value on the exclusive identification register of the other process node other than the process node "1" (S1912). The search processing unit 630 then proceeds to S1901 to process the storage process on the other process node.

The search processing unit 630 proceeds to operations in FIG. 19B. The search processing unit 630 notifies the storage processing unit 640 of the data of the exclusive identification register (S1913). Subsequent to S1913, the storage processing unit 640 initializes the exclusive identification register (S1914).

The search processing unit 630 determines whether the state transition instruction to the group synchronization mode has been received (S1915). If it is determined in S1915 that the state transition instruction has been issued (yes from S1915), the search processing unit 630 determines whether the partial synchronization of the node of an area β out of an area α and area β, both synchronizable, is complete (S1916). The node of the area β refers to the database storing a transaction data group including the exclusive item bit train other than the highest frequency of occurrence pattern, and the node of the area a refers to the database storing the transaction data group including the exclusive item bit train having the highest frequency of occurrence pattern.

If it is determined in S1916 that the partial synchronization of the node of the area 16 is complete (yes from S1916), the search processing unit 630 quits the partial synchronization mode and then proceeds to the group synchronization mode. If it is determined in S1915 that the state transition instruction to the group synchronization mode has not been received (no from S1915), the search processing unit 630 proceeds to S1901 (see FIG. 19A).

If it is determined in S1916 that the partial synchronization of the node of the area β is not complete (no from S1916), the search processing unit 630 proceeds to S1901 (see FIG. 19A).

If the state transition instruction to the group synchronization mode has not been received, the search processing unit 630 sets an exclusive item bit train in an empty process node because time is available before proceeding to the group synchronization mode. If the partial synchronization is not complete, the transaction data to be partially synchronized still remains. Before receiving the state transition instruction to the group synchronization mode, the search processing unit 630 sets an exclusive item bit train on an empty process node as long as time is available.

As described above, the forward proxy device 600 performs the partial synchronization triggered by the setting of the record satisfying condition (A) on the process node "1." In the partial synchronization mode illustrated in FIGS. 18A-18D, the partial synchronization corresponding to eight processes is performed until the state transition to the group synchronization mode. Thus, 14 transaction data units have been processed without performing the group synchronization mode. According to the related art distributed processing, at least four occurrences of the group synchronization mode are likely. In comparison with the case in which 14 transaction data units are processed by four process nodes, the number of occurrences of group synchronization mode is small. The resulting process time is reduced. Throughput of each process unit per unit time is increased, and processing efficiency is increased.

Group Synchronization Mode

Figure 20:
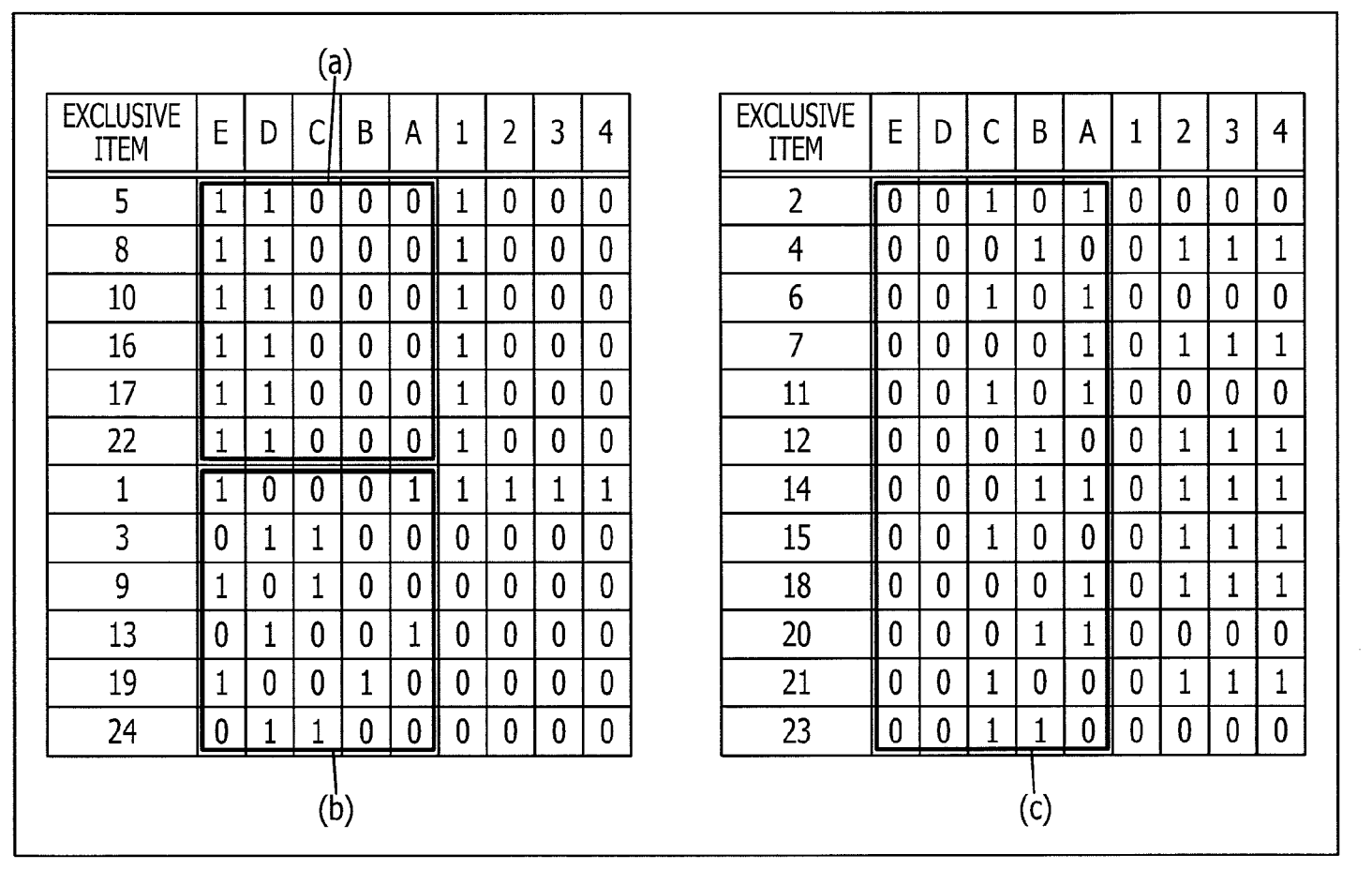

The group synchronization mode in succession to the partial synchronization mode is described below. FIG. 20 illustrates a storage example of the transaction data item cache table of four process nodes in the group synchronization mode. The transaction data item cache table of FIG. 20 lists an exclusive item bit train at the timing of the completion of the partial synchronization mode and a flag of an attribute table. In other words, the transaction data item cache table of FIG. 20 is filled with the transaction data waiting for the group synchronization.

Figure 21:
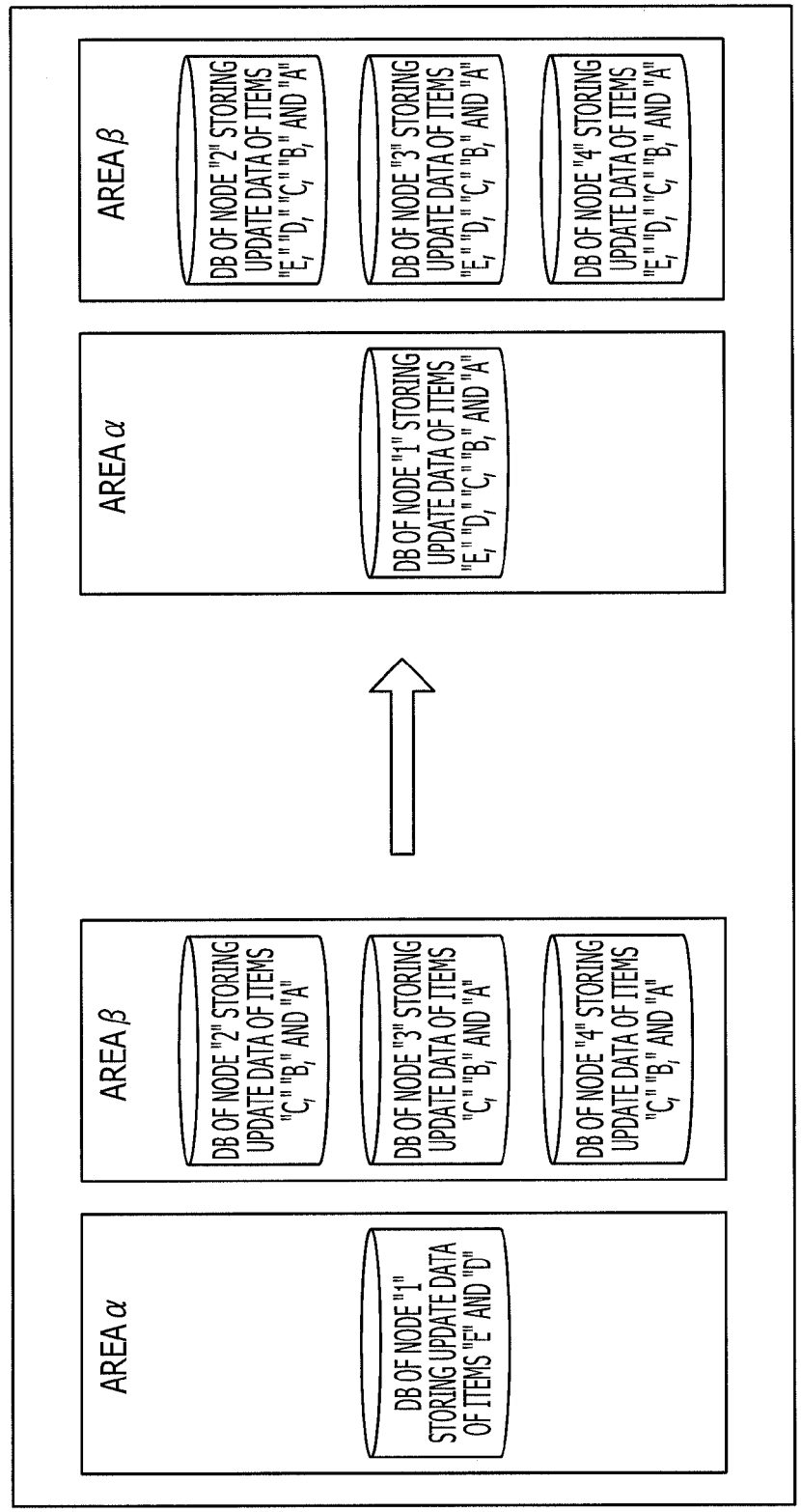
FIG. 21 illustrates a group synchronization process performed between the process nodes.

FIG. 21 illustrates an example of the group synchronization process among the process nodes. The left portion of FIG. 21 illustrates a state of the area α and the area β prior to the group synchronization process and the right portion of FIG. 21 illustrates a state of the area α and the area β subsequent to the group synchronization process. The group synchronization process is performed among the process nodes with the area α and the area β separated as illustrated in FIG. 21. The area a corresponds to the database as a process target of the process node "1" processed with a higher priority. The area a thus holds updated data of the exclusive item names "E" and "D."

The area β corresponds to each database as a process target of a process node other than the process node "1." The area β thus holds updated data of the exclusive item names "C," "B," and "A" other than the exclusive item names "E" and "D."

In the group synchronization process, the databases of the areas α and β reflect mutually the updated data thereof. As illustrated in the right portion of FIG. 21, the areas α and β reflect mutually the data of the exclusive item names thereof, and the updated data includes information related to all the exclusive item names.

FIG. 22 illustrates a deletion process of a processed transaction ID on the transaction data item cache table. FIG. 23 illustrates a storage process of an unprocessed transaction ID on the transaction data item cache table. On the transaction data item cache table of FIG. 20, the transaction IDs responsive to the transaction data that has undergone the group synchronization process are deleted at a time regardless of the grouping of (a), (b), and (c) as illustrated in FIG. 22. Whether the transaction ID has been processed or not is determined based on the flag of the attribute table.

Since an empty cell is caused in the transaction data item cache table subsequent to the deletion process of the pressed transaction ID, a transaction ID corresponding to newly received transaction data is stored as illustrated in FIG. 23.

Figure 24:
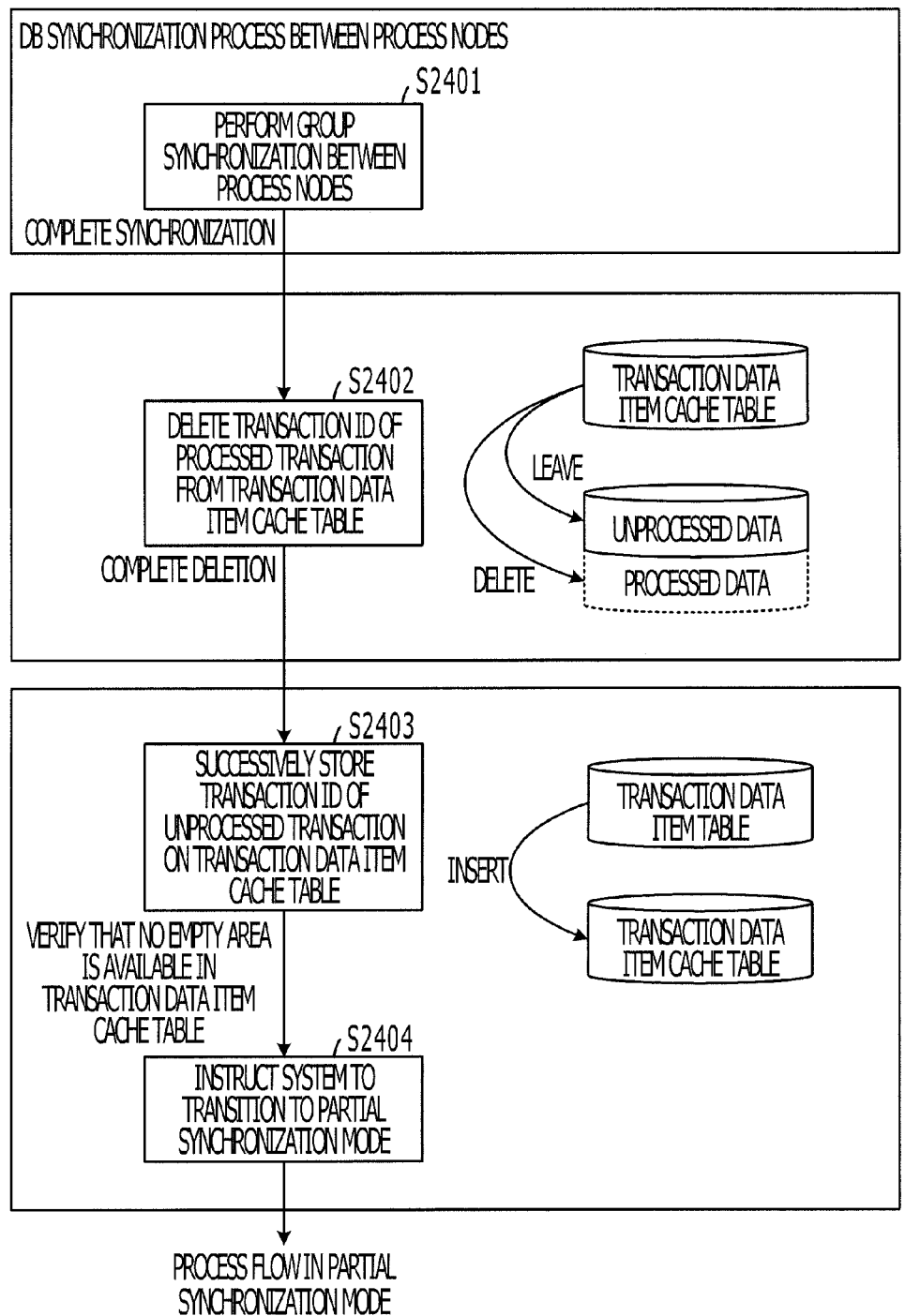
FIG. 24 illustrates a deletion and storage process on the transaction data item cache table in a group synchronization mode.

FIG. 24 illustrates a deletion process and a storage process of the transaction data item cache table in the group synchronization mode. As illustrated in FIG. 24, the group synchronization process is performed on the databases of the process nodes of FIG. 21 (S2401). Operation in S2401 is performed by the dispatch processing unit 650.

The processed transaction ID is deleted from the transaction data item cache table (S2402). In operation in S2402, only the processed data in the transaction data item cache table is deleted as discussed with reference to FIG. 22. Operation in S2402 is performed by the storage processing unit 640.

Unprocessed transaction IDs are successively stored on the transaction data item cache table (S2403). A state transition instruction to the partial synchronization mode is issued to the system in response to the occurrence of an empty cell in the transaction data item cache table (S2404). The group synchronization mode is thus complete. Operations in S2403 and S2404 are executed by the exclusive item addition processing unit 620.

As discussed with reference to FIG. 23, the transaction ID corresponding to the unprocessed transaction data is stored in the transaction data item cache table, but only the transaction data acquired by the transaction acquiring processing unit 610 may be stored in the transaction data item cache table. If the transaction acquiring processing unit 610 has acquired a large amount of transaction data, the transaction data item cache table is immediately filled. If an empty cell remains, a waiting state continues until the transaction data item cache table is fully filled.

The state may transition into the partial synchronization mode before the transaction data item cache table is fully filled. The transaction data to be executed by the process node "1" may become deficient, and the state may transition into the group synchronization mode soon. As the capacity of each of the groups (a), (b), and (c), the total capacity of the transaction data item cache table may be adjusted depending on the tendency of the transaction data to be processed. Each process node thus performs the process thereof efficiently.

Applications of the Distributed Processing Process of the Embodiments

As described above, the distributed processing process of the embodiments is particularly effective in the update process of master data that is to be processed on a near-real-time basis. For example, the distributed processing process finds applications in an on-line ticket reservation system for hotels, transportation, events, and the like.

In the on-line ticket reservation system, accessing may center on the substantially same record such as a highly favored seat or room. In the related art distributed processing process, accessing centered on the substantially same record leading to a lock state affects the entire system. For example, accessing for the process request of a reservation on a modestly favored seat or room needs to be on the substantially same record, but in practice is distributed among process nodes. As a result, access centering on the substantially same record leads to a lock state, and frequent occurrences of the synchronization process. Waiting time beyond workload occurs.

With the embodiment applied to the distributed processing process, the processes causing access centering are sorted among particular process nodes. A lock state caused by the access centering on the substantially same record is thus avoided. The synchronization process frequently takes place with the process requests centered on the substantially same record if the stateful design is implemented. The use of the distributed processing process of the embodiment sorts the accessing of the processes, which could otherwise center on a particular process node. The process requests to the process targets, such as the reservation of a modestly favored seat or room, may be dispersed. In such a case, the process requests may be sorted to the remaining process nodes in parallel. The occurrences of the (group) synchronization processes among the process requests are restricted, and the waiting time caused in each process is reduced.

The distributed processing process of the embodiment may find applications in an online warehouse management system that receives process requests from a plurality of customers. As in the reservation system, process requests are different in frequency between popular commercial products and other products.

A particular process node processes a process request to a popular product with a higher priority. Another process node processes in parallel another process request. Even if the process requests centered on a particular node, the lock state is controlled. Since the synchronization process is controlled, each process node is left more to execute the process thereof responsive to the process request than in related art. As a result, the throughput of the entire system is increased.

The distributed processing process of the embodiment may be executed by causing one of a personal computer and a workstation to execute a prepared distributed processing program. The distributed processing program may be stored on one of the computer readable recording media including a hard disk, a flexible disk, a compact disk-read-only memory (CD-ROM), a magneto-optical disk (MO), and a digital versatile disk (DVD). The distributed processing program is executed by reading onto a computer from the recording medium. The distributed processing program may be supplied via a network such as the Internet. The recording media may be non-transitory.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A distributed processing device, comprising:
one or more processors configured to perform a procedure including:
receiving a plurality of process requests of a plurality of processes related to one of a plurality of records stored on a database;
acquiring an execution frequency of each of the plurality of processes responsive to the plurality of process requests related to a record identified by an attribute name, on a per attribute name basis of a plurality of attribute names, each attribute name identifying each of the plurality of records;
sorting the plurality of process requests into a first set and a second set in accordance with the acquired execution frequency of each process on each of the plurality of attribute names, the first set being responsive to a record identified by a first attribute name from among the plurality of attribute names and the second set being different from the first set;
determining a first node, serving as an allocation destination of the one or more process requests sorted in the first set, from among a plurality of nodes, each node having the database;
allocating the one or more process requests sorted in the first set to the first node; and
calculating, on a per attribute name basis, the execution frequency of each of the plurality of processes responsive to the process requests received by the receiving unit during a constant period,
wherein the acquiring acquires the calculated execution frequency of a process during the constant period for each of the plurality of attribute names.

2. The distributed processing device according to claim 1, wherein the procedure further includes:
generating a bit train for each of the plurality attribute names, each attribute name identifying each record, the bit train indicating whether each of the plurality of process requests includes the attribute name,
wherein the sorting sorts the plurality of process requests into the first set and the second set in accordance with the bit train and the execution frequency of each process corresponding to each of the attribute names.

3. The distributed processing device according to claim 1, wherein
the sorting sorts the plurality of process requests into the first set and the second set in accordance with the execution frequency of each process on each of the plurality of attribute names, the first set responsive to a record identified by the first attribute name having the highest execution frequency and the second set being different from the first set.

4. A distributed processing device, comprising:
one or more processors configured to perform a procedure including:
receiving a plurality of process requests of a plurality of processes related to one of a plurality of records stored on a database;
acquiring an execution frequency of each of the plurality of processes responsive to the plurality of process requests related to a record identified by an attribute name, on a per attribute name basis of a plurality of attribute names, each attribute name identifying each of the plurality of records;
sorting the plurality of process requests into a first set and a second set in accordance with the acquired execution frequency of each process on each of the plurality of attribute names, the first set being responsive to a record identified by a first attribute name from among the plurality of attribute names and the second set being different from the first set;
determining a first node, serving as an allocation destination of the one or more process requests sorted in the first set, from among a plurality of nodes, each node having the database; and
allocating the one or more process requests sorted in the first set to the first node and allocating one or more process requests sorted in the second set to a second node different from the first node among the plurality of nodes; and
a storage unit that stores in a mutually mapped state each of the plurality of process requests, a reception time of the process, and information indicating whether the process request is allocated by the allocation unit or not, wherein the procedure further includes:
first searching the storage unit for a first process request from among the process requests sorted in the first set, the first process request not allocated by the allocation unit and having the oldest reception time;
selecting the second node from among the remaining nodes of the plurality of nodes excluding the first node; and
second searching the storage unit for a second process request from among the process requests sorted in the second set, the second process request not allocated by the allocation unit and having the oldest reception, time, wherein
the allocating allocates the first process request to the first node, and the second process request to the second node.

5. The distributed processing device according to claim 4, wherein the storage unit stores each of the plurality of process requests with identification information mapped thereto, the identification information identifying, from among the plurality of nodes, a node to which the process request is allocated;
the second searching searches the storage unit for a third process request, the third process request allocated to one of the plurality of nodes and having the oldest reception time based on mishit of the second process request; and
the allocating allocates the third process request to a node to which the third process request has not been allocated from among the plurality of nodes excluding the first node.

6. The distributed processing device according to claim 4, wherein the procedure further includes:
issuing a synchronization command to the plurality of nodes based on mishit of the first process request, the synchronization command for equalizing data contents of record groups between the databases.

7. A non-transitory computer readable storage medium storing a distributed processing program, the distributed processing program causing a computer to execute a process, the process comprising:
receiving a plurality of process requests of a plurality of processes related to one of a plurality of records stored on a database;
acquiring an execution frequency of each of the plurality of processes responsive to the plurality of process requests related to a record identified by an attribute name, on a per attribute name basis of a plurality of attribute names, each attribute name identifying each of the plurality of records;
sorting the plurality of process requests into a first set and a second set in accordance with the acquired execution frequency of each process on each of the plurality of attribute names, the first set being responsive to a record identified by a first attribute name from among the plurality of attribute names and the second set being different from the first set;
determining a first node, serving as an allocation destination of the one or more process requests sorted in the first set, from among a plurality of nodes, each node having the database;
allocating the one or more process requests sorted in the first set to the first node; and
calculating, on a per attribute name basis, the execution frequency of each of the plurality of processes responsive to the process requests received during a constant period,
wherein the acquiring acquires the calculated execution frequency of a process during the constant period for each of the plurality of attribute names.

8. The non-transitory computer readable storage medium according to claim 7, wherein the process further comprises:
generating a bit train for each of the plurality attribute names, each attribute name identifying each record, the bit train indicating whether each of the plurality of process requests includes the attribute name, and
wherein the sorting sorts the plurality of process requests into the first set and the second set in accordance with the bit train and the execution frequency of each process corresponding to each of the attribute names.

9. The non-transitory computer readable storage medium according to claim 7, wherein
the sorting sorts the plurality of process requests into the first set and the second set in accordance with the execution frequency of each process on each of the plurality of attribute names, the first set responsive to a record identified by the first attribute name having the highest execution frequency and the second set being different from the first set.

10. A non-transitory computer readable storage medium storing a distributed processing program, the distributed processing program causing a computer to execute a process, the process comprising:

receiving a plurality of process requests of a plurality of processes related to one of a plurality of records stored on a database;

acquiring an execution frequency of each of the plurality of processes responsive to the plurality of process requests related to a record identified by an attribute name, on a per attribute name basis of a plurality of attribute names, each attribute name identifying each of the plurality of records;

sorting the plurality of process requests into a first set and a second set in accordance with the acquired execution frequency of each process on each of the plurality of attribute names, the first set being responsive to a record identified by a first attribute name from among the plurality of attribute names and the second set being different from the first set;

determining a first node, serving as an allocation destination of the one or more process requests sorted in the first set, from among a plurality of nodes, each node having the database;

allocating the one or more process requests sorted in the first set to the first node and allocating one or more process requests sorted in the second set to a second node different from the first node among the plurality of nodes;

storing in a mutually mapped state on a storage unit each of the plurality of process requests, a reception time of the process, and information indicating whether the process request is allocated or not;

searching the storage unit for a first process request from among the process requests sorted in the first set, the first process request not allocated and having the oldest reception time;

selecting the second node from among the remaining nodes of the plurality of nodes excluding the first node; and searching the storage unit for a second process request from among the process requests sorted in the second set, the second process request not allocated and having the oldest reception time, wherein the allocating allocates the first process request to the first node, and the second process request to the second node.

11. The non-transitory computer readable storage medium according to claim 10, wherein the process further comprises:
issuing a synchronization command to the plurality of nodes based on mishit of the first process request, the synchronization command for equalizing data contents of record groups between the databases.

12. The non-transitory computer readable storage medium according to claim 10, wherein the process further comprises:
storing each of the plurality of process requests with identification information mapped thereto, the identification information identifying from among the plurality of nodes a node to which the process request is allocated;
searching the storage unit for a third process request, the third process request allocated to one of the plurality of nodes and having the oldest reception time based on mishit of the second process request; and
allocating the third process request to a node to which the third process request has not been allocated from among the plurality of nodes excluding the first node.

13. A distributed processing method, comprising:
receiving a plurality of process requests of a plurality of processes to one of a plurality of records stored on a database;
using a processing unit;
acquiring an execution frequency of each of the plurality of processes responsive to the plurality of process requests related to a record identified by an attribute name, on a per attribute name basis of a plurality of attribute names, each attribute name identifying each of the plurality of records;
sorting the plurality of process requests into a first set and a second set in accordance with the acquired execution frequency of each process on each of the plurality of attribute names, the first set responsive to a record identified by a first attribute name from among the plurality of attribute names and the second set being different from the first set;
determining a first node, serving as an allocation destination of the one or more process requests sorted in the first set, from among a plurality of nodes, each node having the database;
allocating the one or more process requests sorted in the first set to the first node; and
calculating, on a per attribute name basis, the execution frequency of each of the plurality of processes responsive to the process requests received during a constant period,
wherein the acquiring acquires the calculated execution frequency of a process during the constant period for each of the plurality of attribute names.

* * * * *